US012715962B2

(12) United States Patent
Murakami et al.

(10) Patent No.: US 12,715,962 B2

(45) Date of Patent: Aug. 25, 2026

(54) BLOCK COPOLYMER, PRODUCTION METHOD THEREFOR, POLYMERIC ELECTROLYTE MATERIAL, POLYMERIC ELECTROLYTE MOLDED ARTICLE, POLYMERIC ELECTROLYTE FILM, ELECTROLYTE FILM EQUIPPED WITH CATALYST LAYER, MEMBRANE ELECTRODE COMPOSITE, SOLID POLYMER FUEL CELL, AND WATER ELECTROLYSIS TYPE HYDROGEN GENERATING DEVICE

(71) Applicant: TORAY INDUSTRIES, INC., Tokyo (JP)

(72) Inventors: Kazuho Murakami, Otsu (JP); Kazuma Matsui, Otsu (JP); Tsuyoshi Tanaka, Otsu (JP); Daisuke Izuhara, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 515 days.

(21) Appl. No.: 18/282,291

(22) PCT Filed: Feb. 28, 2022

(86) PCT No.: PCT/JP2022/008261

§ 371 (c)(1),
(2) Date: Sep. 15, 2023

(87) PCT Pub. No.: WO2022/202123

PCT Pub. Date: Sep. 29, 2022

(65) Prior Publication Data

US 2024/0182638 A1 Jun. 6, 2024

(30) Foreign Application Priority Data

Mar. 23, 2021 (JP) ................................ 2021-048314
Sep. 14, 2021 (JP) ................................ 2021-149191

(51) Int. Cl.

| | |
|---|---|
| ***H01M 8/1018*** | (2016.01) |
| ***C08G 61/10*** | (2006.01) |
| ***C08G 65/40*** | (2006.01) |
| ***C25B 1/04*** | (2021.01) |
| ***C25B 13/08*** | (2006.01) |
| ***H01M 8/1025*** | (2016.01) |
| ***H01M 8/1027*** | (2016.01) |
| ***H01M 8/1039*** | (2016.01) |
| *H01M 8/10* | (2016.01) |

(52) U.S. Cl.

CPC .......... *C08G 65/405* (2013.01); *C08G 61/10* (2013.01); *C08G 65/4056* (2013.01); *C25B 1/04* (2013.01); *C25B 13/08* (2013.01); *H01M 8/1018* (2013.01); *H01M 8/1025* (2013.01); *H01M 8/1027* (2013.01); *H01M 8/1039* (2013.01); *C08G 2261/126* (2013.01); *C08G 2261/1428* (2013.01); *C08G 2261/1452* (2013.01); *C08G 2261/312* (2013.01); *C08G 2261/41* (2013.01); *C08G 2261/90* (2013.01); *H01M 2008/1095* (2013.01)

(58) Field of Classification Search

CPC ........ C25B 1/04; C25B 13/08; H01M 8/1018; H01M 8/1025; H01M 8/1027; H01M 8/103; H01M 8/1032; H01M 8/1039

See application file for complete search history.

(56) References Cited

U.S. PATENT DOCUMENTS

| | | | |
|---|---|---|---|
| 2014/0154489 | A1 | 6/2014 | Sohn et al. |
| 2014/0193742 | A1 | 7/2014 | Izuhara et al. |
| 2014/0322628 | A1 | 10/2014 | Umeda et al. |

FOREIGN PATENT DOCUMENTS

| | | | | |
|---|---|---|---|---|
| CN | 103597007 | A | | 2/2014 |
| JP | 2012-17351 | A | | 1/2012 |
| JP | 2013064125 | A | * | 4/2013 |
| JP | 2013079367 | A | * | 5/2013 |
| JP | 2015-122308 | A | | 7/2015 |
| JP | 2018-110108 | A | | 7/2018 |
| JP | 2020-21579 | A | | 2/2020 |
| WO | WO2013/027724 | A1 | | 2/2013 |

(Continued)

OTHER PUBLICATIONS

International Search Report (PCT/ISA/210), issued in PCT/JP2022/008261, dated May 17, 2022.

(Continued)

*Primary Examiner* — Kevin E Yoon

(74) *Attorney, Agent, or Firm* — Birch, Stewart, Kolasch & Birch, LLP

(57) ABSTRACT

A block copolymer containing one or more segments containing an ionic group (hereinafter referred to as an "ionic segment(s)") and one or more segments containing no ionic group (hereinafter referred to as a "nonionic segment(s)"), wherein at least one of the ionic segment or the nonionic segment contains: constituent units composed of an aromatic hydrocarbon polymer (hereinafter referred to as a "constituent unit"); and a first linker that links the constituent units with each other. A block copolymer and a polymer electrolyte material produced using the block copolymer are made feasible, in which the block copolymer can achieve high proton conductivity under low-humidity conditions, excellent mechanical strength and chemical stability, and enhanced in-process capability.

25 Claims, No Drawings

(56) References Cited

FOREIGN PATENT DOCUMENTS

WO WO2013/031675 A1 3/2013

OTHER PUBLICATIONS

Written Opinion of the International Searching Authority (PCT/ISA/237), issued in PCT/JP2022/008261, dated May 17, 2022.
Chinese Office Action and Search Report for Chinese Application No. 202280021417.9, dated Mar. 25, 2026, with English translation of the Office Action.

* cited by examiner

BLOCK COPOLYMER, PRODUCTION METHOD THEREFOR, POLYMERIC ELECTROLYTE MATERIAL, POLYMERIC ELECTROLYTE MOLDED ARTICLE, POLYMERIC ELECTROLYTE FILM, ELECTROLYTE FILM EQUIPPED WITH CATALYST LAYER, MEMBRANE ELECTRODE COMPOSITE, SOLID POLYMER FUEL CELL, AND WATER ELECTROLYSIS TYPE HYDROGEN GENERATING DEVICE

TECHNICAL FIELD

The present invention relates to a block copolymer and a method of producing the same, and to a polymer electrolyte material, molded polymer electrolyte product, polymer electrolyte membrane, catalyst coated membrane, membrane electrode assembly, polymer electrolyte fuel cell, and water electrolysis hydrogen generator that are produced using the block copolymer.

BACKGROUND ART

Fuel cells are a kind of power generator from which electric energy is extracted by electrochemical oxidation of a fuel such as hydrogen or methanol, and have recently attracted attention as a clean energy source. Above all, polymer electrolyte fuel cells have a low standard operating temperature of around 100° C. and a high energy density. Therefore, polymer electrolyte fuel cells are expected to be widely used for relatively small distributed power generation facilities as well as for power generators for mobile objects such as automobiles and ships. In addition, polymer electrolyte fuel cells have also attracted attention as a power source for small mobile devices and portable devices, and are expected to be substitute applications for secondary batteries such as nickel-hydrogen batteries and lithium-ion batteries in mobile phones and personal computers.

A fuel cell usually includes, as a unit, a cell including a membrane electrode assembly (MEA) sandwiched between separators. In the MEA, catalyst layers are arranged on both sides of an electrolyte membrane, and gas diffusion layers are further arranged on both sides of the resulting laminate. In the MEA, the catalyst layers and the gas diffusion layers that are arranged on both sides of the electrolyte membrane form a pair of electrode layers, and one of the electrode layers is an anode electrode and the other is a cathode electrode. A fuel gas containing hydrogen comes into contact with the anode electrode, and the air comes into contact with the cathode electrode, whereby electric power is generated by an electrochemical reaction. The electrolyte membrane is mainly made from a polymer electrolyte material. The polymer electrolyte material is also used as a binder for the catalyst layer.

Conventionally, "Nafion" (registered trademark) (manufactured by The Chemours Company), which is a fluoropolymer electrolyte, has been widely used as a polymer electrolyte material. On the other hand, an inexpensive hydrocarbon electrolyte material that can be used in place of "Nafion" (registered trademark) and that is excellent in membrane characteristics has been actively developed in recent years. A hydrocarbon electrolyte material excels in low gas permeability and heat resistance, and studies have actively been made particularly on an electrolyte material produced using an aromatic polyether ketone or an aromatic polyether sulfone.

Among others, a block copolymer in which a segment containing an ionic group (hereinafter, "containing an ionic group" is referred to as "ionic") and a segment containing no ionic group (hereinafter, "containing no ionic group" is referred to as "nonionic") are linked by a linker is suggested as a hydrocarbon polymer electrolyte material having excellent proton conductivity and excellent mechanical strength and chemical stability under low-humidity conditions (see, for example, Patent Literature 1 and 2).

CITATION LIST

Patent Literature

Patent Literature 1: WO2013/002274
Patent Literature 2: JP2011-181278A

SUMMARY OF INVENTION

Technical Problem

However, with the use of a block copolymer described in Patent Literature 1 and 2, the effect of enhancing the proton conductivity, mechanical strength, and chemical stability under low-humidity conditions is still not complete, and, such a block copolymer and a polymer electrolyte material produced using the same are desired to be further improved.

In view of the background of such a conventional technology, an object of the present invention is to develop a block copolymer having excellent proton conductivity under low-humidity conditions, and having excellent mechanical strength and physical durability, and develop a polymer electrolyte material produced using the block copolymer.

Solution to Problem

The present inventors have considered that the cause for which a conventional technology has the above-described problem consists in synthesizing a segment in a block copolymer only by a copolymerization reaction of a monomer until the segment has a number-average molecular weight of interest. In addition, the present inventors have discovered that linking constituent units of a segment via a highly reactive linker, in which the constituent unit is a polymer having a number-average molecular weight smaller than a number-average molecular weight of interest, makes it possible that the polymer is precisely controlled up to a number-average molecular weight of interest, and has excellent in-process capability, and that the segment has a higher molecular weight.

To solve the above-described problem, a block copolymer according to the present invention has the following constitution. That is, a block copolymer containing one or more segments containing an ionic group (hereinafter referred to as an "ionic segment(s)") and one or more segments containing no ionic group (hereinafter referred to as a "nonionic segment(s)"), wherein at least one of the ionic segment or the nonionic segment contains: constituent units each composed of an aromatic hydrocarbon polymer (hereinafter simply referred to as a "constituent unit"); and a first linker (L1) that links the constituent units with each other.

In addition, a method of producing a block copolymer according to the present invention has the following constitution. That is, a method of producing the above-described block copolymer, including at least a step (1) of allowing a compound that gives the constituent units to react with a compound that gives the first linker.

A polymer electrolyte material according to the present invention has the following constitution. That is, a polymer electrolyte material containing the above-described block copolymer.

A molded polymer electrolyte product according to the present invention has the following constitution. That is, a molded polymer electrolyte product including the above-described polymer electrolyte material.

A polymer electrolyte membrane according to the present invention has the following constitution. That is, a polymer electrolyte membrane produced using the polymer electrolyte material.

A catalyst coated membrane according to the present invention has the following constitution. That is, a catalyst coated membrane constituted using the polymer electrolyte material.

A membrane electrode assembly according to the present invention has the following constitution. That is, a membrane electrode assembly constituted using the polymer electrolyte material.

A polymer electrolyte fuel cell according to the present invention has the following constitution. That is, a polymer electrolyte fuel cell constituted using the polymer electrolyte material.

A water electrolysis hydrogen generator according to the present invention has the following constitution. That is, a water electrolysis hydrogen generator constituted using the polymer electrolyte material.

In a block copolymer according to the present invention, the ionic segment preferably has the constituent units and the first linker that links the constituent units with each other.

For the block copolymer according to the present invention, it is preferable that the first linker is represented by any one of the following general formulae (M1) to (M8).

[Chem. 1]

(M1)

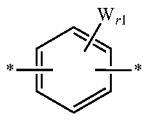

(M2)

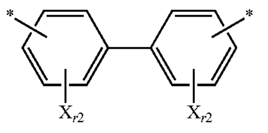

(M3)

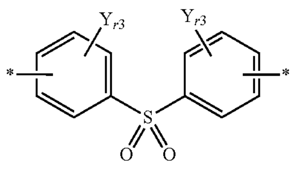

(M4)

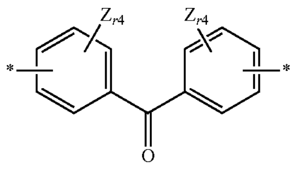

-continued (M5)

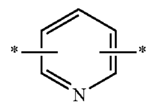

(M6)

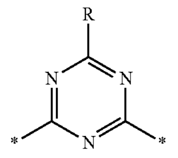

(M7)

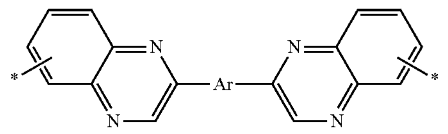

(M8)

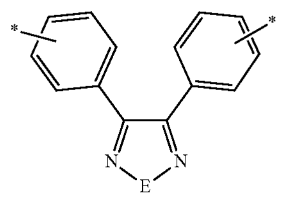

(In the general formulae (M1) to (M4), W to Z independently represent a group selected from the group consisting of H, $NO_2$, CN, $CF_3$, F, Cl, Br, and I, and r1 to r4 independently represent an integer of 1 to 4; in the general formula (M6), R represents an arbitrary organic group; in the general formula (M7), Ar represents an arbitrary arylene group; and in the general formula (M8), E represents an oxygen atom or a sulfur atom. The general formulae (M1) to (M8) may be further substituted with an electron-withdrawing group(s). The symbol * represents a linking site between each of the general formulae (M1) to (M8) and one of the constituent units.)

The block copolymer according to the present invention preferably has the ionic segment(s) and the nonionic segment(s) alternately.

In the block copolymer according to the present invention, the block copolymer preferably has a second linker site that links the ionic segment with the nonionic segment.

In the block copolymer according to the present invention, the ionic segment preferably has an aromatic polyether structure.

In the block copolymer according to the present invention, the ionic segment preferably has an aromatic polyether ketone structure.

In the block copolymer according to the present invention, the ionic segment preferably contains a structure represented by the following general formula (S1).

[Chem. 2]

(S1)

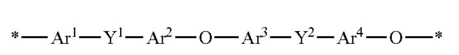

(In the general formula (S1), $Ar^1$ to $Ar^4$ independently represent a substituted or unsubstituted arylene group, and at least one of $Ar^1$ to $Ar^4$ has an ionic group. $Y^1$ and $Y^2$ independently represent a ketone group or a protective group that may be induced to a ketone group. The symbol * represents a bond with the general formula (S1) or with another structure.)

In the block copolymer according to the present invention, the structure represented by the general formula (S1) is preferably a structure represented by the following general formula (S2).

[Chem. 3]

(S2)

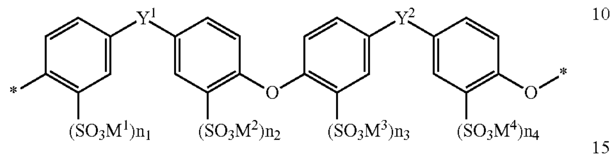

(In the general formula (S2), $Y^1$ and $Y^2$ independently represent a ketone group or a protective group that may be induced to a ketone group. $M^1$ to $M^4$ independently represent a hydrogen atom, metal cation, or ammonium cation. $n_1$ to $n_4$ are independently 0 or 1, and at least one of $n_1$ to $n_4$ is 1. The symbol * represents a bond with the general formula (S2) or with another structure.)

In the block copolymer according to the present invention, the nonionic segment preferably contains an aromatic polyether structure.

In the block copolymer according to the present invention, the nonionic segment preferably contains an aromatic polyether ketone structure.

In the block copolymer according to the present invention, the nonionic segment preferably contains a structure represented by the following general formula (S3).

[Chem. 4]

(S3)

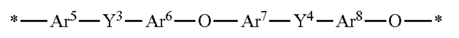

(In the general formula (S3), $Ar^5$ to $Ar^8$ independently represent an arylene group with the proviso that none of $Ar^5$ to $Ar^8$ has an ionic group. $Y^3$ and $Y^4$ independently represent a ketone group or a protective group that may be induced to a ketone group. The symbol * represents a bond with the general formula (S3) or with another structure.)

In the block copolymer according to the present invention, the structure represented by the general formula (S3) is preferably a structure represented by the following general formula (S4).

[Chem. 5]

(S4)

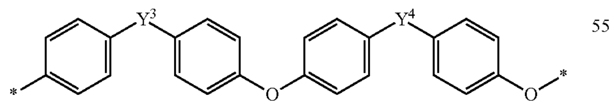

(In the general formula (S4), $Y^3$ and $Y^4$ independently represent a ketone group or a protective group that may be induced to a ketone group. The symbol * represents a bond with the general formula (S4) or with another structure.)

A block copolymer according to the present invention preferably has a co-continuous phase-separation structure.

A method of producing a block copolymer according to the present invention preferably includes, after the step (1), a step (2) of allowing the compound obtained in the step (1) to react with a compound that gives the other segment.

The method of producing a block copolymer according to the present invention preferably includes, before the step (2), a step (1') of allowing any one compound of a compound that gives an ionic segment and a compound that gives a nonionic segment to react with a compound that gives a second linker, to introduce the second linker into both ends of the any one compound.

In the method of producing a block copolymer according to the present invention, a compound that gives each of the first linker and the second linker is preferably represented by any one of the following general formulae (N1) to (N8).

[Chem. 6]

(N1)

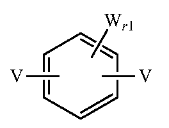

(N2)

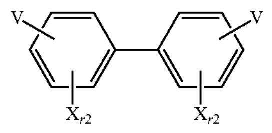

(N3)

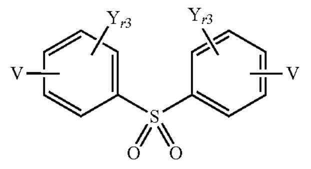

(N4)

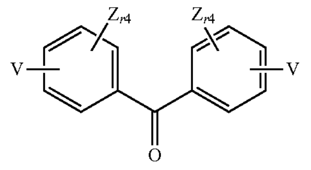

(N5)

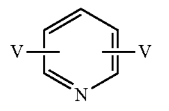

(N6)

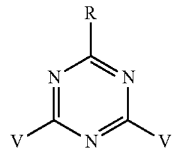

(N7)

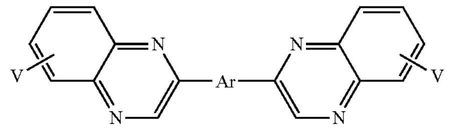

(N8)

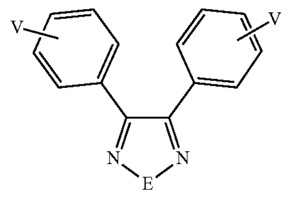

(In the general formulae (N1) to (N8), V represents Cl or F. In the general formulae (N1) to (N4), W to Z independently represent a group selected from the group consisting of H, $NO_2$, CN, $CF_3$, F, Cl, Br, and I, and r1 to r4 independently represent an integer of 1 to 4; in the general formula (N6), R represents an arbitrary organic group; in the general formula (N7), Ar represents an arbitrary arylene group; and in the general formula (N8), E represents an oxygen atom or a sulfur atom. The general formulae (N1) to (N8) may be further substituted with an electron-withdrawing group(s).)

Advantageous Effects of Invention

A block copolymer according to the present invention, as a polymer electrolyte material, can exhibit excellent processability, have good physical durability, and simultaneously exhibit high proton conductivity under conditions including low-humidity.

DESCRIPTION OF EMBODIMENTS

Embodiments of the present invention will now be described in detail, and the present invention is not limited to the below-described embodiments, and can be performed with various modifications in accordance with the purpose or usage.

(Block Copolymer)

A block copolymer according to the present invention is a block copolymer having one or more ionic segments and one or more nonionic segments.

In the present invention, the segment is a partial structure of a macromonomer in the block copolymer, in which the macromonomer is used to synthesize the block copolymer. A block copolymer according to the present invention contains a nonionic segment(s) together with an ionic segment(s). In this regard, the nonionic segment is termed so in the present invention, but the segment may contain an ionic group in a small amount in the range that does not adversely affect the effects of the present invention. Hereinafter, "containing no ionic group and nonionic" are used in the same sense in some cases.

A block copolymer according to the present invention is a block copolymer in which two or more kinds of segment chains incompatible with each other, that is, a hydrophilic segment containing an ionic group and a hydrophobic segment containing no ionic group are linked to form one polymer chain. In the block copolymer, the short-distance interaction caused by the repulsion between chemically different segment chains causes phase separation into nano- or micro-domains composed of the respective segment chains. Then, the segment chains are covalently bound to each other, thus causing a long-distance interaction, and this effect causes each domain to be arranged in a specifically ordered manner. A higher-order structure produced by aggregation of domains composed of the respective segment chains is called a nano- or micro-phase-separation structure. Here, the domain means a mass formed by aggregation of similar segments in one or a plurality of polymer chains. For the ionic conduction of the polymer electrolyte membrane, the spatial arrangement of the ion-conductive segment in the membrane, that is, the nano- or micro-phase-separation structure is important.

Suitably regulating the length of the molecular chain of the segment, that is, the molecular weight of the segment enhances the aggregability of each segment when the phase-separation structure is formed. In cases where the length of the molecular chain of the ionic segment is lengthened, the structure of the ionic domain is enlarged, and the proton conductivity under low-humidity conditions is enhanced. In cases where the length of the molecular chain of the nonionic segment is lengthened, the structure of the nonionic domain is enlarged, and the mechanical strength, rate of dimensional change, and mechanical durability are enhanced.

In a block copolymer according to the present invention, at least one of the ionic segment or the nonionic segment has: constituent units composed of an aromatic hydrocarbon polymer (hereinafter referred to as a "constituent unit"); and a first linker that links the constituent units with each other. In the present invention, the constituent unit refers to a polymer constituting a segment.

In the present invention, the first linker is defined as a structure contained in the segment, the structure being a site that links the constituent units constituting a segment with each other, and is different in the chemical structure from the constituent units. The constituent units linked via the first linker may be the same constituent units between each other or a combination of a plurality of different constituent units.

The block copolymer according to the present invention may contain the first linker only in one of the ionic segment and the nonionic segment, or may contain the first linker in each of the ionic segment and the nonionic segment.

The first linker links the constituent units with each other while inhibiting the randomization of the oligomer, the scission of the molecular chain, the deactivation of the end, a side reaction that can occur during the synthesis of the copolymer, and the like. Linking the constituent units in the segment with each other via a linker makes it possible to easily and precisely regulate the number-average molecular weight of the segment to a number-average molecular weight of interest.

In a conventional synthesizing method in which a compound that gives a segment is synthesized only by the copolymerization reaction of a monomer, the number-average molecular weight of the segment obtained varies significantly from a number-average molecular weight of interest in some cases. The larger the number-average molecular weight of interest is, the larger the range of variation tends to be. What is considered as this factor is: a monomer to be used for synthesis; the purity and moisture content of each of a solvent and a catalyst; an environment in a reaction system; the efficiency of stirring; a slight difference in the reaction temperature or the like; or the like. These factors are substantially difficult to eliminate. That is, a conventional synthesizing method causes a variation in the number-average molecular weight of the segment between batches, failing to stably obtain a number-average molecular weight of interest.

In some of the cases where the number-average molecular weight of a segment is smaller or larger than a number-average molecular weight of interest, the block copolymer synthesized using a compound that gives such a segment is decreased in the number-average molecular weight and weight-average molecular weight. This is presumably because the ratio of the ends of a compound that gives a segment goes out of a suitable range when a block copolymer is synthesized. As a result, the mechanical strength (for example, tensile strength elongation) of the resulting block copolymer is decreased.

From the above-described viewpoint, precise control of the molecular weight of a segment is important for the production of a block copolymer, and the above-described control of a molecular weight is made possible because the constituent units in a segment are linked with each other via a linker. That is, a block copolymer according to the present invention, in which the constituent units in at least one of the ionic segment or the nonionic segment are linked with each other via a linker, has good and stable mechanical strength. Furthermore, at least in the ionic segment, the constituent units are preferably linked with each other via a linker.

In addition, linking the constituent units of a segment with each other via a linker makes it possible to synthesize a segment having a high molecular weight.

For example, in cases where polymers having a number-average molecular weight of 30,000 are used as constituent units, which are linked via the first linker, the constituent units, when in the form of a dimer, become a segment having a number-average molecular weight of 60,000, and the constituent units, when in the form of a trimer, become a segment having a number-average molecular weight of 90,000. However, it is not necessary to link all the constituent units constituting a segment via a linker, but it is also possible to use polymers having a number-average molecular weight of 30,000 as constituent units, link only part of the constituent units via the first linker, and regulate the segment to a number-average molecular weight of 45,000. In this case, the block copolymer results in containing, as segments, a dimer that is a structure containing the first linker and a monomer that is a structure containing no first linker, and accordingly, the lengths of the molecular chains of the segments become ununiform. Thus, all the constituent units are preferably linked with each other via the first linker.

In cases where the ionic segment has the first linker that links the constituent units with each other, the constituent unit may be an ionic constituent unit or a nonionic constituent unit with the proviso that at least one constituent unit of the ionic segment is ionic. From the viewpoint of enhancing the density of the ionic group, all of the constituent units of the ionic segment are preferably ionic.

In cases where the nonionic segment has the first linker that links the constituent units with each other, the constituent units of the nonionic segment are all nonionic.

In some cases, the ionic polymer has lower polymerizability, and makes it more difficult to increase the molecular weight, and to control the molecular weight, than the nonionic polymer, and thus, it is preferable that at least the ionic segment has the first linker that links the constituent units with each other. An ionic segment having a number-average molecular weight of 60,000 or more was difficult to obtain by a conventional synthesizing method, but now can be synthesized easily and stably by linking the constituent units with each other via a linker.

The number-average molecular weight and the weight-average molecular weight in the present invention are each defined as a value measured in terms of standard polystyrene using gel permeation chromatography (GPC), as described in the below-described Examples.

As a segment used in the present invention, a segment having constituent units and a first linker that links the constituent units with each other is represented by the following general formula (C1), wherein the constituent unit is represented by (A), and the first linker is represented by (L1).

[Chem. 7]

(C1)

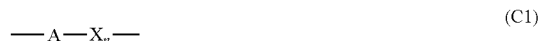

(C2)

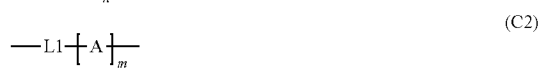

In the general formula (C1), X is a structure represented by the general formula (C2), and n represents an integer of 1 or greater. In the general formula (C2), m represents an integer of 1 or greater. In cases where n is 2 or greater, a plurality of m's may be the same or different. In cases where m is 2 or greater, such a case means that two or more structures, -A-, are bound to L1. This means that the segment has a branched structure.

To obtain the above-described segment, a compound to serve as the first linker site needs to be a highly reactive compound such as can link the constituent units with each other while inhibiting the randomization of the copolymer and the scission of the segment. In view of this, (L1) preferably has, but is not limited to, a structure such as the following general formulae (M1) to (M8).

[Chem. 8]

(M1)

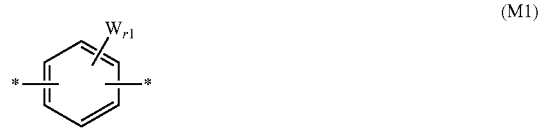

(M2)

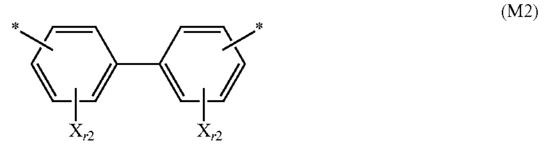

(M3)

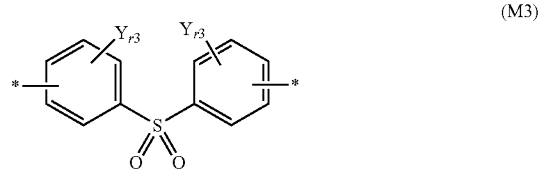

(M4)

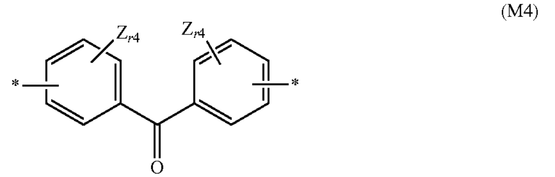

(M5)

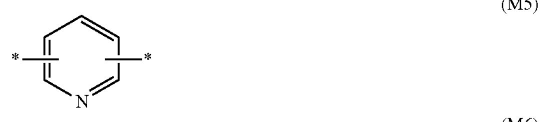

(M6)

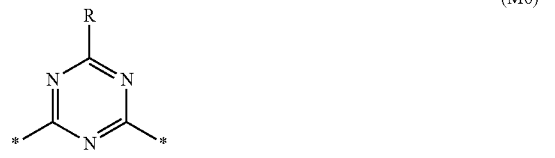

(M7)

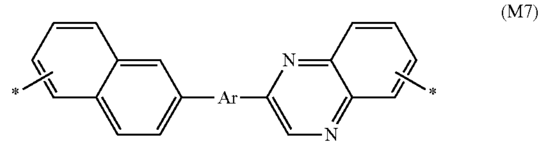

-continued (M8)

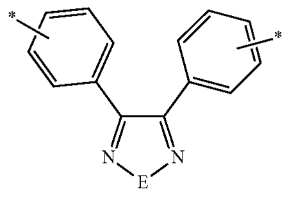

In the general formulae (M1) to (M4), W to Z independently represent a group selected from the group consisting of H, $NO_2$, CN, $CF_3$, F, Cl, Br, and I, and r1 to r4 independently represent an integer of 1 to 4; in the general formula (M6), R represents an arbitrary organic group; in the general formula (M7), Ar represents an arbitrary arylene group; and in the general formula (M8), E represents an oxygen atom or a sulfur atom. The general formulae (M1) to (M8) may be further substituted with an electron-withdrawing group(s). The symbol * represents a linking site between each of the general formulae (M1) to (M8) and a constituent unit A.

Such a compound that gives (L1) as above-described (hereinafter referred to as a "linker compound") is preferably, but not limited to, at least one selected from the following general formulae (N1) to (N12). In the present invention, examples of the linker compound include a dihalide compound and a multihalide compound that each result in a linker site after reaction. The multihalide compound refers to a compound having three or more halides as substituents. In cases where a straight-chain segment is desired to be obtained, a dihalide compound is preferably used as a linker. In cases where a branched structure is desired to be formed in a segment, a multihalide compound is preferably used as a linker. In addition, a dihalide compound and a multihalide compound may be used in combination.

[Chem. 9]

(N1)

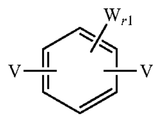

(N2)

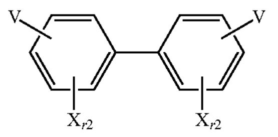

(N3)

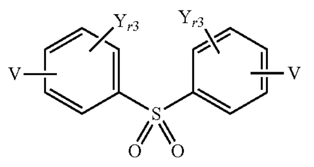

(N4)

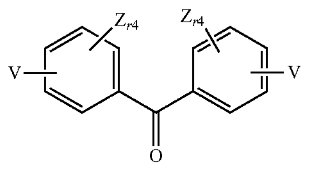

-continued (N5)

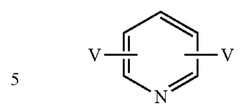

(N6)

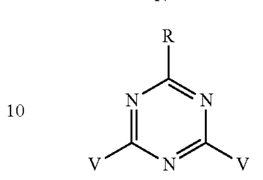

(N7)

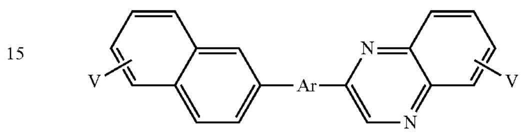

(N8)

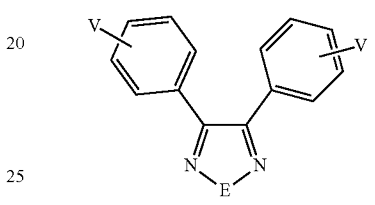

In the general formulae (N1) to (N8), V represents Cl or F. W to Z, r1 to r4, R, Ar, and E are the same as in the general formulae (M1) to (M8).

Specific examples of a linker compound as a compound that satisfies (N1) include 1,2-difluorobenzene, 1,3-difluorobenzene, 1,4-difluorobenzene, 2,4-difluorobenzonitrile, 1,2,4-trifluorobenzene, 1,3,5-trifluorobenzene, 1,2,3,4,-tetrafluorobenzene, 1-chloro-2,4,5-trifluorobenzene, 2,4,5-trifluorobenzonitrile, 1,2,4-trifluoro-5-nitro benzene, 1,2,4-trifluoro-5-(trifluoromethyl)benzene, hexafluorobenzene, 1-chloro-2,3,4,5,6-pentafluorobenzene, 2,3,4,5,6-pentafluorobenzonitrile, 1,2,3,4,5-pentafluoro6-(trifluoromethyl)benzene, 2,3,5,6-tetrafluoroterephthalonitrile, 2,4,5,6-tetrafluoroisophthalonitrile, 2,3,5-trifluoroisophthalonitrile, 2,4,6-trifluoroisophthalonitrile, 1,2,3,4,5-pentafluoro-6-(trifluoromethyl)benzene, 1,2,3,4,5-pentafluoro-6-nitrobenzene, and the like.

Examples of a compound that satisfies (N2) include 2,2'-dichloro-1,1'-biphenyl, 4,4'-dichloro-1,1'-biphenyl, 2,2'-difluoro-1,1'-biphenyl, 4,4'-difluoro-1,1'-biphenyl, decafluorobiphenyl, 2,2',3,3',4,4',6,6'-octafluoro-5,5'-dinitro-1,1'-biphenyl, 2,2',3,3',4,4',5,6,6'-nonafluoro-5'-nitro-1, 1'-biphenyl, and the like.

Examples of a compound that satisfies (N3) include 4,4'-difluorodiphenyl sulfone, 4,4'-dichlorodiphenyl sulfone, 5,5'-sulfonylbis(2-fluorobenzonitrile), 4,4'-sulfonylbis(1-fluoro-2-nitrobenzene), 4,4'-sulfonylbis(1-fluoro-2-(trifluoromethyl)benzene), 2-fluoro-5-((4-fluoro-3-(trifluoromethyl)phenyl)sulfonyl)benzonitrile, and the like.

Examples of a compound that satisfies (N4) include bis(4-fluorophenyl)ketone, 5,5'-carbonylbis(2-fluorobenzonitrile), bis(4-fluoro-3-(trifluoromethyl)phenyl)ketone, bis (4-fluoro-3-nitrophenyl), and the like.

Examples of a compound that satisfies (N5) include 2,6-difluoropyridine, 2,6-dichloropyridine, and the like.

Examples of a compound that satisfies (N6) include 2,4-difluoro-6-methoxy-1,3,5-triazine, 2,4-dichloro-6-methoxy-1,3,5-triazine, and the like.

Examples of a compound that satisfies (N7) include 1,4-bis(6-fluoroquinoxaline-2-yl)benzene, 1,4-bis(6-chloroquinoxaline-2-yl)benzene, and the like.

Examples of a compound that satisfies (N8) include 3,4-bis(4-fluorophenyl)-1,2,5-oxadiazole, 3,4-bis(4-fluorophenyl)-1,2,5-thiadiazole, and the like.

In a block copolymer according to the present invention, at least one of the ionic segment or the nonionic segment contains a constituent unit having an aromatic hydrocarbon polymer. Being a hydrocarbon means being other than a perfluoro substance, and an aromatic hydrocarbon polymer means a polymer other than a perfluoro polymer, and constituted mainly of an aromatic ring.

In the present invention, the aromatic ring contained in the aromatic hydrocarbon polymer may contain not only a hydrocarbon aromatic ring but also a hetero ring. In addition, the polymer may be constituted partially of an aliphatic unit together with the aromatic ring unit. Specific examples of the aromatic hydrocarbon polymer include polymers having, in the main chain, a structure selected from polysulfone, polyether sulfone, polyphenylene oxide, a polyarylene ether polymer, polyphenylene sulfide, polyphenylene sulfide sulfone, polyparaphenylene, a polyarylene polymer, polyarylene ketone, polyether ketone, polyarylene phosphine phoxide, polyether phosphine phoxide, polybenzoxazole, polybenzothiazole, polybenzimidazole, polyamide, polyimide, polyetherimide, and polyimidesulfone together with an aromatic ring. Among these, aromatic polyether polymers are preferable from the viewpoints of cost and polymerizability.

An aromatic polyether polymer refers to a polymer constituted mainly of an aromatic ring, in which polymer the repeating unit contains at least an ether bond as a mode of linking an aromatic ring unit. Examples of the structure of the aromatic polyether polymer include, but are not limited to, an aromatic polyether, aromatic polyether ketone, aromatic polyether ether ketone, aromatic polyether ketone ketone, aromatic polyether ether ketone ketone, aromatic polyether ketone ether ketone ketone, aromatic polyether imide, aromatic polyether sulfone, and the like. From the viewpoints of chemical stability and cost, an aromatic polyether ketone polymer and a polyether sulfone polymer are preferable, and from the viewpoints of mechanical strength, dimensional stability, and physical durability, an aromatic polyether ketone polymer is most preferable.

An aromatic polyether ketone polymer refers to a polymer constituted mainly of an aromatic ring, in which polymer the repeating unit contains at least an ether bond and a ketone bond as modes of linking an aromatic ring unit.

An aromatic polyether sulfone polymer refers to a polymer constituted mainly of an aromatic ring, in which polymer at least an ether bond and a sulfone bond are contained as modes of linking an aromatic ring unit.

A block copolymer according to the present invention preferably has the ionic segment(s) and the nonionic segment(s) alternately. Having these segments alternately makes it possible to obtain a block copolymer the phase-separation structure of which and the size of the domain of which are strictly controlled, and which has excellent low-humidity proton conductivity. Here, having the segments alternately may have the below-described second linker site between the ionic segment and the nonionic segment.

The block copolymer according to the present invention preferably contains one or more second linker (L2) sites that link the ionic segment with the nonionic segment. In the present invention, the second linker is a site that links the ionic segment with the nonionic segment, and is defined as a site different in the chemical structure from the ionic segment and the nonionic segment.

The second linker may have the same structure as the above-described first linker, or may have a different structure. This second linker links different segments while inhibiting the randomization of the copolymer due to an ether exchange reaction, the scission of the segment, a side reaction that can occur during the synthesis of a copolymer, and the like. Accordingly, using, as a raw material, a compound that gives such a second linker makes it possible to obtain a block copolymer without decreasing the molecular weight of each segment.

Specific suitable examples of the second linker include decafluorobiphenyl, hexafluorobenzene, 4,4'-difluorodiphenyl sulfone, 2,6-difluorobenzonitrile, and the like, but are not limited to these in the present invention.

(Ionic Segment)

In a block copolymer according to the present invention, the ionic segment preferably contains an aromatic polyether structure from the viewpoints of cost and polymerizability, and most preferably contains an aromatic polyether ketone structure from the viewpoints of mechanical strength, dimensional stability, and physical durability. An aromatic polyether structure refers to a structure constituted mainly of an aromatic ring, in which structure the repeating unit contains at least an ether bond as a mode of linking an aromatic ring unit. An aromatic polyether ketone structure refers to a structure constituted mainly of an aromatic ring, in which structure the repeating unit contains at least an ether bond and a ketone bond as modes of linking an aromatic ring unit.

In a block copolymer according to the present invention, the ionic segment preferably contains a structure represented by the following general formula (S1), from the viewpoints of dimensional stability, mechanical strength, and chemical stability.

[Chem. 10]

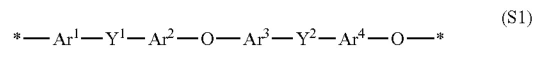

(S1)

In the general formula (S1), $Ar^1$ to $Ar^4$ independently represent a substituted or unsubstituted arylene group, and at least one of $Ar^1$ to $Ar^4$ has an ionic group. $Y^1$ and $Y^2$ independently represent a ketone group or a protective group that may be induced to a ketone group. The symbol * represents a bond with the general formula (S1) or with another structure.

In addition, the ionic segment may contain a structure other than represented by the general formula (S1).

Herein, examples of the aromatic ring preferable for $Ar^1$ to $Ar^4$ include, but are not limited to: hydrocarbon arylene groups such as a phenylene group, naphthylene group, biphenylene group, and fluorenediyl group; and heteroarylene groups such as pyridinediyl, quinoxalinediyl, and thiophenediyl; and the like.

The ionic group to be used for a block copolymer according to the present invention is preferably an atomic group having a negative charge, and preferably has a proton exchange capability. Such a functional group is preferably a sulfonic group, sulfonimide group, sulfate group, phosphonic group, phosphate group, or carboxylic group, as described below.

[Chem. 11]

(f1)

(f2)

(f3)

(f4)

(f5)

(f6)

(f7)

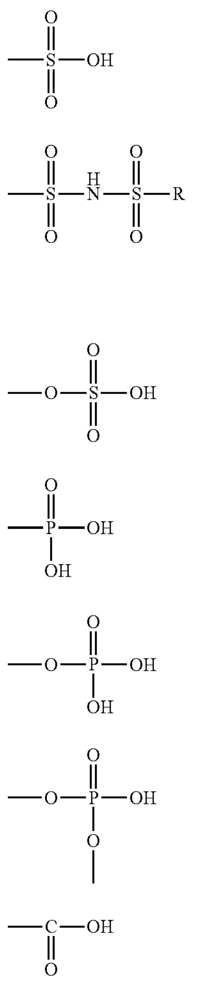

Such an ionic group encompasses the above-described functional groups (f1) to (f7) formed into a salt. Examples of an arbitrary cation that forms such a salt include an arbitrary metal cation, $NR_4^+$ (wherein R is an arbitrary organic group), and the like. Without particular limitation, the metal cation is preferably Na, K, or Li which is inexpensive, and can easily undergo proton exchange.

The block copolymer can contain two or more of these ionic groups, the combination of which can be suitably determined in accordance with the polymer structure or the like. Above all, it is more preferable that the polymer contains at least a sulfonic group, a sulfonimide group, or a sulfate group, from the viewpoint of high proton conductivity, and it is most preferable that the polymer contains a sulfonic group, from the viewpoint of raw material cost.

In a block copolymer according to the present invention, a structure represented by the general formula (S1) is preferably a structure represented by the following general formula (P1), from the viewpoints of dimensional stability and raw material availability, and still more preferably a structure represented by the following general formula (S2), from the viewpoints of raw material availability and polymerizability.

[Chem. 12]

(P1)

(S2)

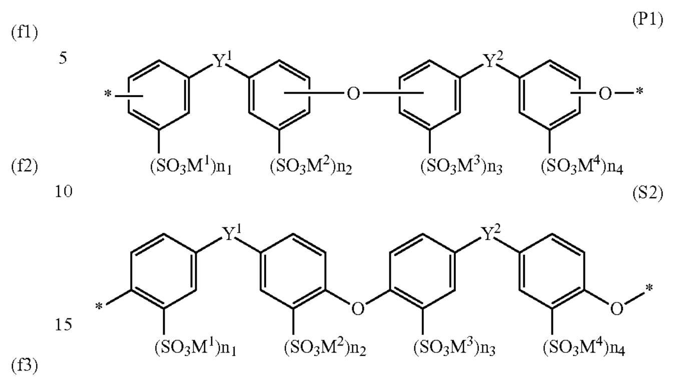

In the general formulae (P1) and (S2), $Y^1$ and $Y^2$ independently represent a ketone group or a protective group that may be induced to a ketone group. $M^1$ to $M^4$ independently represent a hydrogen atom, metal cation, or ammonium cation. $n_1$ to $n_4$ are independently 0 or 1, and at least one of $n_1$ to $n_4$ is 1. The symbol * represents a bond with the general formulae (P1) and (S2) or with another constituent unit.

Furthermore, from the viewpoints of raw material availability and polymerizability, $n_1=1$, $n_2=1$, $n_3=0$, and $n_4=0$, or $n_1=0$, $n_2=0$, $n_3=1$, and $n_4=1$ are most preferable.

The amount of a structure represented by the general formula (S1) and contained in the ionic segment is more preferably 20 mol % or more, still more preferably 50 mol % or more, most preferably 80 mol % or more.

Examples of an ionic monomer to be used to synthesize such an ionic segment as above-described include an aromatic activated dihalide compound. From the viewpoints of chemical stability, production cost, and the possibility of precisely controlling the amount of an ionic group, it is preferable that an aromatic activated dihalide compound having an ionic group introduced thereinto is used as an aromatic activated dihalide compound to be used in the ionic segment. Suitable specific examples of the monomer having a sulfonic group as an ionic group include, but are not limited to, 3,3'-disulfonate-4,4'-dichlorodiphenyl sulfone, 3,3'-disulfonate-4,4'-difluorodiphenyl sulfone, 3,3'-disulfonate-4,4'-dichlorodiphenyl ketone, 3,3'-disulfonate-4,4'-difluorodiphenyl ketone, 3,3'-disulfonate-4,4'-dichlorodiphenylphenylphosphine oxide, 3,3'-disulfonate-4,4'-difluorodiphenylphenylphosphine oxide, and the like.

From the viewpoints of proton conductivity and hydrolysis resistance, the ionic group is most preferably a sulfonic group, but the monomer having the above-described ionic group may have another ionic group.

Among the above-described monomers having a sulfonic group, 3,3'-disulfonate-4,4'-dichlorodiphenyl ketone and 3,3'-disulfonate-4,4'-difluorodiphenyl ketone are more preferable from the viewpoints of chemical stability and physical durability, and 3,3'-disulfonate-4,4'-difluorodiphenyl ketone is most preferable from the viewpoint of polymerization activity.

An ionic segment synthesized using, 3,3'-disulfonate-4,4'-dichlorodiphenyl ketone or 3,3'-disulfonate-4,4'-difluorodiphenyl ketone as a monomer having an ionic group contains a constituent unit represented by the following general formula (p1), and is preferably used. The aromatic polyether polymer is a component not only characterized by the high crystallinity possessed by a ketone group but also having better hot-water resistance than a sulfone group, is a component effective for a material having excellent dimensional stability, mechanical strength, and physical durability under high-temperature and high-humidity conditions, and thus, is still more preferably used. These sulfonic groups during polymerization are each preferably in the form of a salt with a monovalent cationic species. The monovalent cationic species may be sodium, potassium, another metal species, various kinds of amine, or the like, and is not limited to these. These aromatic activated dihalide compounds can be used singly, and a plurality of aromatic activated dihalide compounds can be used in combination.

[Chem. 13]

(p1)

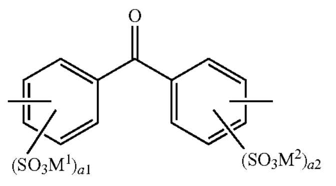

(In the general formula (p1), $M^1$ and $M^2$ each represent a hydrogen, metal cation, or ammonium cation, and a1 and a2 each represent an integer of 1 to 4. A constituent unit represented by the general formula (p1) may be optionally substituted.)

In addition, copolymerizing aromatic activated dihalide compounds, one having an ionic group and the other having no ionic group, makes it possible to control the density of the ionic group. However, from the viewpoint of securing the continuity of the proton conduction path, it is more preferable that, in the ionic segment, an aromatic activated dihalide compound having no ionic group is not copolymerized.

More suitable specific examples of the aromatic activated dihalide compound having no ionic group include 4,4'-dichlorodiphenyl sulfone, 4,4'-difluorodiphenyl sulfone, 4,4'-dichlorodiphenyl ketone, 4,4'-difluorodiphenyl ketone, 4,4'-dichlorodiphenylphenylphosphine oxide, 4,4'-difluorodiphenylphenylphosphine oxide, 2,6-dichlorobenzonitrile, 2,6-difluorobenzonitrile, and the like. Among these, 4,4'-dichlorodiphenyl ketone and 4,4'-difluorodiphenyl ketone are more preferable from the viewpoint of crystallization, mechanical strength, physical durability, and hot-water resistance, and 4,4'-difluorodiphenyl ketone is most preferable from the viewpoint of polymer activity. These aromatic activated dihalide compounds can be used singly, and a plurality of aromatic activated dihalide compounds can be used in combination.

A polymer electrolyte material synthesized using 4,4'-dichlorodiphenyl ketone or 4,4'-difluorodiphenyl ketone as an aromatic activated dihalide compound further contains a constituent site represented by the following general formula (p2), and is preferably used. The constituent unit becomes a component that affords an intermolecular cohesive force and crystallinity, becomes a material having excellent dimensional stability, mechanical strength, and physical durability under high-temperature and high-humidity conditions, and thus is preferably used.

[Chem. 14]

(p2)

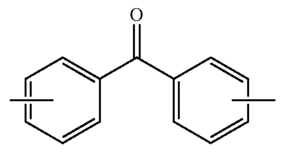

(A constituent unit represented by the general formula (p2) may be optionally substituted, but contains no ionic group.)

In addition, a nonionic monomer to be used to synthesize an ionic segment is, for example, an aromatic diphenol compound, and is preferably an aromatic diphenol compound having the below-described protective group, in particular.

As above, monomers to be used to synthesize a constituent unit of the ionic segment have been described.

In cases where the ionic segment has the constituent units and the first linker that links the constituent units with each other, a structure represented by the general formulae (S1), (P1), and (S2) is preferably contained in the constituent units from the viewpoints of dimensional stability, mechanical strength, and chemical stability.

Preferable examples of a structure that is other than a structure represented by the general formula (S1), and may be contained as an ionic segment include an aromatic polyether ketone structure composed of a structure represented by the following general formulae (T1) and (T2).

[Chem. 15]

(T1)

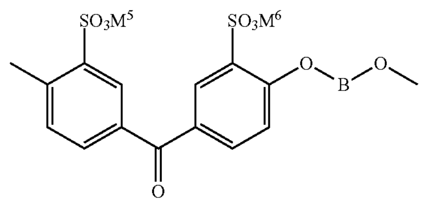

(T2)

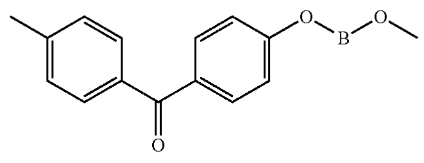

In the general formulae (T1) and (T2), B represents a divalent organic group containing an aromatic ring. $M^5$ to $M^6$ independently represent a hydrogen atom, metal cation, or ammonium cation.

In this aromatic polyether ketone copolymer, changing the compositional ratio of the constituent units represented by the general formulae (T1) and (T2) makes it possible to control the ion exchange capacity.

Among others, an ionic segment having a structure represented by the general formula (P1) and structures represented by the general formulae (T1) and (T2) is particularly preferable. Assuming that, in such an ionic segment, the amounts of the constituent units represented by the general formulae (P1), (T1), and (T2) are p1, t1, and t2 respectively, p1 is preferably 75 parts by mole or more, more preferably 90 parts by mole or more, still more preferably 100 parts by mole or more, with respect to 100 parts by mole of the total molar amount of t1 and t2.

Examples of the divalent organic group B containing an aromatic ring in the general formulae (T1) and (T2) include: a residue of various divalent phenol compounds that can be used to polymerize an aromatic polyether polymer by aromatic nucleophilic substitution reaction; and such a residue into which a sulfonic group has been introduced.

Specific suitable examples of the divalent organic group B containing an aromatic ring include, but are not limited to, a group represented by the following general formulae (X'-1) to (X'-6).

[Chem. 16]

(X'-1)

(X'-2)

(X'-3)

(X'-4)

(X'-5)

(X'-6)

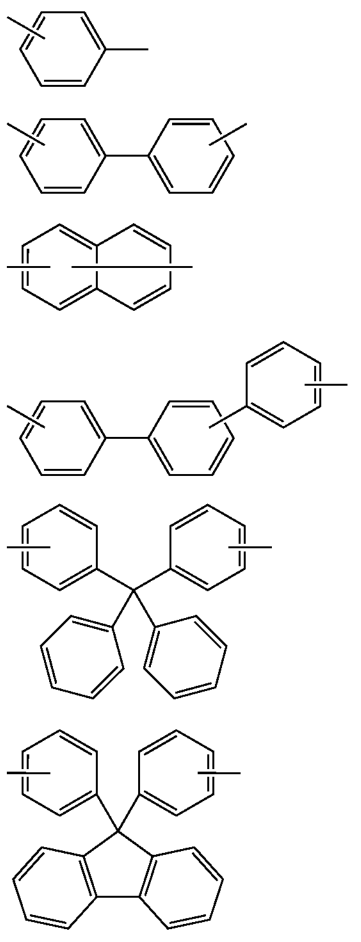

These may have an ionic group or an aromatic group. In addition, these can be used in combination, as required. Among these, groups represented by the general formulae (X'-1) to (X'-4) are more preferable, and groups represented by the general formulae (X'-2) and (X'-3) are most preferable, from the viewpoints of crystallinity, dimensional stability, toughness, and chemical stability.

(Nonionic Segment)

In a block copolymer according to the present invention, the nonionic segment preferably contains an aromatic polyether structure from the viewpoints of cost and polymerizability, and is more preferably an aromatic polyether ketone polymer from the viewpoints of mechanical strength, dimensional stability, and physical durability. The aromatic polyether structure contains at least an aromatic group and an ether bond as repeating unit structures. An aromatic polyether ketone structure refers to a structure constituted mainly of an aromatic ring, in which structure the repeating unit contains at least an ether bond and a ketone bond as modes of linking an aromatic ring unit.

In a block copolymer according to the present invention, the nonionic segment preferably contains a structure represented by the following general formula (S3), from the viewpoints of dimensional stability, mechanical strength, and chemical stability.

[Chem. 17]

(S3)

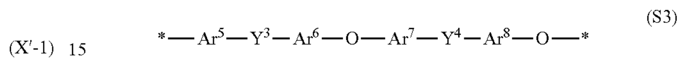

In the general formula (S3), $Ar^5$ to $Ar^8$ independently represent an arylene group with the proviso that none of $Ar^5$ to $Ar^8$ has an ionic group. $Y^3$ and $Y^4$ independently represent a ketone group or a protective group that may be induced to a ketone group. The symbol * represents a bond with the general formula (S3) or with another structure.

Herein, examples of the aromatic ring preferable for $Ar^5$ to $Ar^8$ include, but are not limited to: hydrocarbon arylene groups such as a phenylene group, naphthylene group, biphenylene group, and fluorenediyl group; and heteroarylene groups such as pyridinediyl, quinoxalinediyl, and thiophenediyl; and the like.

In a block copolymer according to the present invention, the nonionic segment preferably contains a structure represented by the following formula (P2), from the viewpoint of raw material availability. Among these, it is still more preferable to contain a constituent unit represented by the following formula (S4), from the viewpoints of mechanical strength, dimensional stability, and physical durability that are due to crystallinity.

[Chem. 18]

(P2)

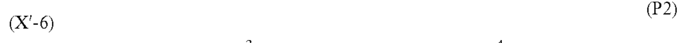

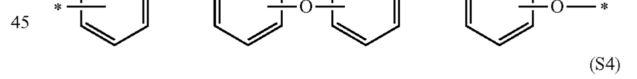

(S4)

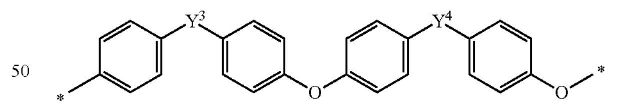

In the general formulae (P2) and (S4), $Y^3$ and $Y^4$ independently represent a ketone group or a protective group that may be induced to a ketone group. The symbol * represents a bond with the general formulae (P2) and (S4) or with another structure.

The amount of a structure represented by the general formula (S3) or (S4) and contained in the nonionic segment is preferably larger, more preferably 20 mol % or more, still more preferably 50 mol % or more, most preferably 80 mol % or more.

In cases where the nonionic segment has the constituent units and the first linker that links the constituent units with each other, a structure represented by the general formulae (S3), (P2), and (S4) is preferably contained in the constituent units from the viewpoints of dimensional stability, mechanical strength, and chemical stability.

(Detailed Description of Block Copolymer)

A block copolymer according to the present invention is preferably constituted of: an ionic segment containing a structure represented by the general formula (S1); and a block copolymer having a nonionic segment containing a structure represented by the general formula (S3).

In cases where the nonionic segment contains a structure represented by the general formula (S3), the segment exhibits crystallinity. The block copolymer containing such a nonionic segment can be produced, for example, by molding a block copolymer precursor in which a protective group is introduced into at least a nonionic segment, and then deprotecting at least part of the protective group contained in the molded product. A block copolymer more tends to have poor processability than a random copolymer owing to the crystallization of the polymer having a domain formed therein, and accordingly, it is preferable to introduce a protective group into at least a nonionic segment to enhance the processability, and, in a case where the processability becomes poorer, a protective group is preferably introduced also into the ionic segment.

Preferable examples of such a constituent unit containing a protective group include a constituent unit containing at least one selected from the following general formulae (P3) and (P4).

[Chem. 19]

(P3)

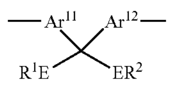

(P4)

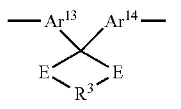

(In the general formulae (P3) and (P4), $Ar^{11}$ to $Ar^{14}$ each represent an arbitrary divalent arylene group; $R^1$ and $R^2$ each represent at least one group selected from H or an alkyl group; $R^3$ represents an arbitrary alkylene group; E represents O or S; and each symbol may represent two or more groups. A group represented by the formulae (P3) and (P4) may be optionally substituted.)

Among these, a method in which, in the general formulae (P3) and (P4), E is O, that is, a ketone site is protected/deprotected with a ketal site is most preferable from the viewpoints of the smell, reactivity, stability of the compound, and the like.

$R^1$ and $R^2$ in the general formula (P3) are each more preferably an alkyl group, still more preferably a $C_{1-6}$ alkyl group, most preferably a $C_{1-3}$ alkyl group, from the viewpoint of stability. In addition, $R^3$ in the general formula (P4) is more preferably a $C_{1-7}$ alkylene group, most preferably a C1-4 alkylene group, from the viewpoint of stability. Specific examples of $R^3$ include, but are not limited to, $—CH_2CH_2—$, $—CH(CH_3)CH_2—$, $—CH(CH_3)CH(CH_3)—$, $—C(CH_3)_2CH_2—$, $—C(CH_3)_2CH(CH_3)—$, $—C(CH_3)_2O(CH_3)_2—$, $—CH_2CH_2CH_2—$, $—CH_2C(CH_3)_2CH_2—$, and the like.

An organic group preferable as each of $Ar^{11}$ to $Ar^{14}$ in the general formulae (P3) and (P4) is a phenylene group, naphthylene group, or biphenylene group. These may be optionally substituted. In the aromatic polyether polymer, $Ar^{13}$ and $Ar^{14}$ in the general formula (P4) are each more preferably a phenylene group from the viewpoints of solubility and easy raw material availability. $Ar^{13}$ and $Ar^{14}$ are each most preferably a p-phenylene group.

Here, examples of a method of protecting a ketone site with a ketal include a method in which a precursor compound having a ketone group is allowed to react with a monofunctional and/or bifunctional alcohol in the presence of an acid catalyst. For example, such a protected ketone site can be produced by allowing 4,4'-dihydroxybenzophenone as a ketone precursor to react in the presence of an acid catalyst such as hydrogen bromide in a monofunctional and/or bifunctional alcohol or a solvent of an aliphatic or aromatic hydrocarbon or the like. The alcohol is a $C_{1-20}$ aliphatic alcohol.

An improving method of producing a ketal monomer is composed of allowing 4,4'-dihydroxybenzophenone as a ketone precursor to react with a bifunctional alcohol in the presence of an alkyl ortho ester and a solid catalyst.

A method of deprotecting at least part of the ketone sites protected with ketals, and thus restoring the ketone sites is subject to no particular limitation. The deprotection reaction can be performed in the presence of water and acid under ununiform or uniform conditions, and from the viewpoints of mechanical strength, physical durability, and solvent resistance, a method in which the material is molded in membrane form or the like, and then acid-treated is more preferable. Specifically, the membrane molded can be immersed in an aqueous hydrochloric acid solution or an aqueous sulfuric acid solution to be deprotected, and the concentration of the acid and the temperature of the aqueous solution can be selected suitably.

The weight ratio of the acidic aqueous solution required for the polymer is preferably 1 to 100, and it is possible to use an even larger amount of water. The acid catalyst is preferably used at a concentration of 0.1 to 50 wt % with respect to the water present. Examples of suitable acid catalysts include: strong mineral acids such as hydrochloric acid, nitric acid, fluorosulfonic acid, and sulfuric acid; and strong organic acids such as p-toluene sulfonic acid and trifluoromethanesulfonic acid. The acid catalyst, the amount of excess water, the reaction pressure, and the like can be selected suitably in accordance with the thickness of the polymer membrane and with the like.

For example, in cases where the membrane has a thickness of 50 μm, immersing the membrane in an acidic aqueous solution, for example, an aqueous solution of 6 N hydrochloric acid, and heating the membrane at 95° C. for 1 to 48 hours makes it possible to deprotect substantially the whole amount of the membrane easily. In addition, even if the polymer is immersed in an aqueous solution of 1 N hydrochloric acid at 25° C. for 24 hours, the majority of the protective groups can undergo deprotection. However, the deprotection is not limited to these conditions, and the deprotection may be performed with acidic gas, organic acid, or the like, or the deprotection may be performed by heat treatment.

In cases where the aromatic polyether polymer contains a linking mode such as a direct bond other than an ether bond, the position of the protective group to be introduced is more preferably an aromatic ether polymer portion from the viewpoint of enhancing the processability.

Specifically, for example, an aromatic polyether polymer containing a constituent unit represented by the general formulae (P3) and (P4) can be synthesized by an aromatic nucleophilic substitution reaction with an aromatic activated dihalide compound, using compounds represented by the following general formulae (P3-1) and (P4-1) respectively as aromatic diphenol compounds. The constituent unit represented by the general formulae (P3) and (P4) may be derived from either an aromatic diphenol compound or an aromatic activated dihalide compound. A constituent unit derived from an aromatic diphenol compound is more preferably used, considering the reactivity of the monomer.

[Chem. 20]

(P3-1)

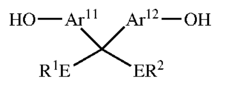

(P4-1)

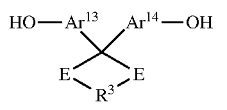

(In the general formulae (P3-1) and (P4-1), $Ar^{11}$ to $Ar^{14}$ each represent an arbitrary divalent arylene group; $R^1$ and $R^2$ each represent at least one group selected from H or an alkyl group; $R^3$ represents an arbitrary alkylene group; and E represents O or S. A compound represented by the general formula (P3-1) and the general formula (P4-1) may be optionally substituted.) As above, preferable protective groups have been described.

Controlling the number-average molecular weight of each of the ionic segment and/or the nonionic segment that constitute a block copolymer in the present invention makes it possible to adjust the average period size of the phase-separation structure of the block copolymer, and to enhance the rate of dimensional change and mechanical durability. For example, the number-average molecular weight of the ionic segment is preferably in the range of from 10,000 to 150,000, more preferably in the range of from 20,000 to 120,000, particularly preferably in the range of from 45,000 to 100,000, from the viewpoints of expanding the average period size of the phase-separation structure, and enhancing the proton conductivity. On the other hand, the number-average molecular weight of the nonionic segment is preferably in the range of from 5,000 to 50,000, more preferably in the range of from 10,000 to 40,000, particularly preferably in the range of from 15,000 to 30,000, from the viewpoint of enhancing the rate of dimensional change and mechanical durability.

Having, in a segment, the first linker structure in the present invention makes it possible to increase the molecular weight of the segment, and to easily regulate the molecular weight of the segment to the above-described preferable range of the number-average molecular weight, even in cases where it is difficult to achieve a number-average molecular weight of interest only by the reaction of the copolymerization of a monomer.

In addition, assuming that, in a block copolymer in the present invention, the number-average molecular weight of the ionic segment is Mn1, and the number-average molecular weight of the nonionic segment is Mn2, it is preferable that the following formula 1 is satisfied, and it is more preferable that the following formula 2 is satisfied. Such a block copolymer enables the block copolymerization reaction to progress suitably, makes it possible to obtain a block copolymer having a high molecular weight, makes it possible to form a phase-separation structure suitable for proton conduction, and thus, is preferable.

$$1.7 \leq Mn1/Mn2 \leq 7.0 \quad \text{(Formula 1)}$$

$$2.0 \leq Mn1/Mn2 \leq 5.0 \quad \text{(Formula 2)}$$

Assuming that, in a block copolymer in the present invention, the number-average molecular weight of the block copolymer is Mn3, it is preferable that the following formula 3 is satisfied, and it is more preferable that the following formula 4 is satisfied.

$$Mn3/(Mn1+Mn2) > 1 \quad \text{(Formula 3)}$$

$$Mn3/(Mn1+Mn2) \geq 1.2 \quad \text{(Formula 4)}$$

In cases where the relation of the formula 3 is satisfied, phase separation suitable for proton conductivity is more easily formed in a polymer electrolyte material containing the block copolymer, and high proton conductivity under low-humidity conditions is more easily achieved.

The ion exchange capacity of a block copolymer according to the present invention is preferably 0.1 to 5 meq/g, more preferably 1.5 meq/g or more, most preferably 2 meq/g or more, from the viewpoint of a balance between proton conductivity and water resistance. In addition, the ion exchange capacity is more preferably 3.5 meq/g or less, most preferably 3 meq/g or less.

The ion exchange capacity of the ionic segment is preferably higher, more preferably 2.5 meq/g or more, still more preferably 3 meq/g or more, most preferably 3.5 meq/g or more, from the viewpoint of proton conductivity under low-humidity conditions. In addition, the ion exchange capacity is more preferably 6.5 meq/g or less, still more preferably 5 meq/g or less, most preferably 4.5 meq/g or less.

The ion exchange capacity of the nonionic segment is preferably lower, more preferably 1 meq/g or less, still more preferably 0.5 meq/g, most preferably 0.1 meq/g or less, from the viewpoints of hot-water resistance, mechanical strength, dimensional stability, and physical durability.

Here, the ion exchange capacity is the molar amount of an ion-exchange group introduced per unit dry weight of each of the block copolymer, polymer electrolyte material, and polymer electrolyte membrane. The ion exchange capacity can be measured by elemental analysis, neutralization titration, or the like. In cases where the ion exchange group is a sulfonic group, the IEC can be calculated from an S/C ratio using an elemental analysis method, but it is difficult to measure the IEC, for example in cases where the electrolyte material contains a sulfur source other than a sulfonic group. Accordingly, in the present invention, the ion exchange capacity is defined as a value obtained by the below-described neutralization titration method.

(Method of Producing Block Copolymer)

Methods of producing a block copolymer according to the present invention will be described below, but the present invention is not limited to these.

A method of producing a block copolymer according to the present invention contains at least the following step (1), and preferably contains the following step (2) after the step (1).

Step (1): a step of allowing a compound that gives the above-described constituent units to react with a compound that gives a first linker. Here, in this step, at least one of a compound that gives an ionic segment or a compound that gives a nonionic segment, in each of which segments the constituent units are linked with each other via the first linker.

Step (2): a step of allowing the product obtained in the step (1), that is, the compound that gives an ionic segment or the compound that gives a nonionic segment to react with the compound that gives the other segment. In this regard, the compound that gives the other segment means a compound that gives a nonionic segment in cases where the compound obtained in the step (1) is a compound that gives an ionic segment, and means a compound that gives an ionic segment in cases where the compound obtained in the step (1) is a compound that gives a nonionic segment.

Here, by the step (1), only one of the compounds that give an ionic segment and a nonionic segment respectively may be obtained, or both of the compounds that give an ionic segment and a nonionic segment respectively may be obtained. In cases where both of the compounds are obtained in the step (1), the compounds obtained in the step (1) are allowed to react with each other to obtain a block copolymer in the step (2).

Including these step (1) and step (2) makes it possible to obtain a block copolymer having excellent in-process capability, and introducing both segments alternately enables the block copolymer the phase-separation structure of which and the size of the domain of which are strictly controlled, and which has excellent low-humidity proton conductivity.

In cases where, in the step (1), the compound that gives the constituent units and the compound that gives the first linker are allowed to react with each other to obtain a compound that gives a segment, and where a number-average molecular weight of interest is not achieved, the compound that gives the first linker may be further added to the reaction system. Sequentially adding, to a reaction system, the compound that gives the first linker makes it possible to easily and precisely adjust the number-average molecular weight of interest of the compound that gives a segment.

A method of producing a block copolymer according to the present invention more preferably contains the following step (1') before the step (2).

Step (1'): a step of allowing any one compound of a compound that gives an ionic segment and a compound that gives a nonionic segment to react with a compound that gives a second linker, to introduce the second linker into both ends of the any one compound.

In this case, the segment allowed to react with the compound that gives the second linker may be a segment into which the first linker has been introduced in the step (1), or may be a segment into which the first linker has not been introduced. Having the step (1') makes it possible to link different segments with each other while inhibiting, for example, a side reaction in the block copolymerization reaction, and makes it possible to obtain a block copolymer the structure of which is controlled more strictly.

More specific examples of a method of producing a block copolymer in the present invention will be described below. However, the present invention is not limited to these.

Each segment and each constituent unit to be used in the present invention are preferably synthesized by an aromatic nucleophilic substitution reaction from the viewpoint of easiness in processes. The aromatic nucleophilic substitution reaction is a method in which a monomer mixture of a dihalide compound and a diol compound is allowed to react in the presence of a basic compound. The polymerization can be performed in the temperature range of from 0 to 350° C., preferably at a temperature of 50 to 250° C. The reaction can be performed in the presence of no solvent, but preferably performed in the presence of a solvent. Examples of solvents that can be used include: aprotic polar solvents such as N,N-dimethylacetoamide, N,N-dimethylformamide, N-methyl-2-pyrrolidone, dimethyl sulfoxide, sulfolane, 1,3-dimethyl-2-imidazolidinone, and hexamethylphosphon triamide. The solvent is not limited to these, and can be a solvent that can be used as a stable solvent in an aromatic nucleophilic substitution reaction. These organic solvents may be used singly or in mixture of two or more kinds thereof.

Examples of basic compounds include sodium hydroxide, potassium hydroxide, sodium carbonate, potassium carbonate, sodium hydrogencarbonate, potassium hydrogencarbonate, and the like. Without limitation to these, a basic compound that makes it possible to form a diol into an active phenoxide structure can be used. In addition, to increase the nucleophilicity of the phenoxide, a crown ether such as 18-crown-6 is suitably added. In some cases, a crown ether coordinates to a sodium ion or potassium ion of a sulfonic group to enhance the solubility of the sulfonate moiety of a monomer or a polymer in an organic solvent, and thus, can be preferably used.

In an aromatic nucleophilic substitution reaction, water is generated as a byproduct in some cases. In this case, it is also possible that, independent of a polymerization solvent, toluene or the like is allowed to coexist in a reaction system to form an azeotrope, in the form of which water can be removed out of the system. In a method of removing water out of the system, a water absorbing agent such as a molecular sieve can be used.

A block copolymer in the present invention can be produced, for example, by synthesizing a block copolymer precursor, and then deprotecting at least part of the protective groups contained in the precursor.

The steps (1) to (2) in a method of producing a block copolymer according to the present invention will be specifically described. However, the present invention is not limited to these.

Step (1): allowing a compound that gives constituent units each having —OM groups (M represents a hydrogen atom, metal cation, or ammonium cation) at both ends to react with a compound that gives a first linker having two or more halide reactive groups, to obtain at least one of a compound that gives an ionic segment having-OM groups at both ends, in which compound constituent units are linked with each other via a linker (L1), or a compound that gives a nonionic segment.

Step (1'): a step of allowing any one compound of a compound that gives an ionic segment having —OM groups at both ends and a compound that gives a nonionic segment to react with a compound that gives a second linker having two or more halide reactive groups, to introduce the second linker sites into both ends of the any one compound.

Step (2): a step of allowing the —OM groups at both ends of the compound that gives an ionic segment or a nonionic segment to react with the second linker sites at both ends of the compound that gives the other segment.

Specific examples of the compound that give a segment both ends of which are each a —OM group, and which is represented by the general formula (S1) and the compound that gives a segment both ends of which are each a —OM group, and which is represented by the general formula (S3) include segment structures represented by the following general formulae (H3-1) and (H3-2) respectively. In addition, examples of a structure formed by allowing a segment having a structure represented by each of the general formulae (H3-1) and (H3-2) to react with a halide linker as the second linker to introduce the linker (L2) into both ends include a structure represented by each of the following general formulae (H3-3) and (H3-4) respectively. However, the present invention is not limited to these.

[Chem. 21]

(H3-1)

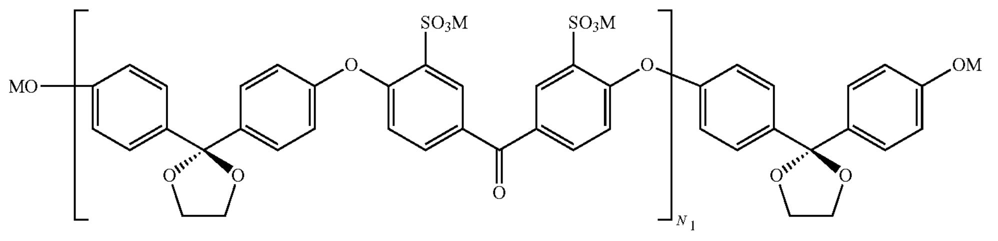

(H3-2)

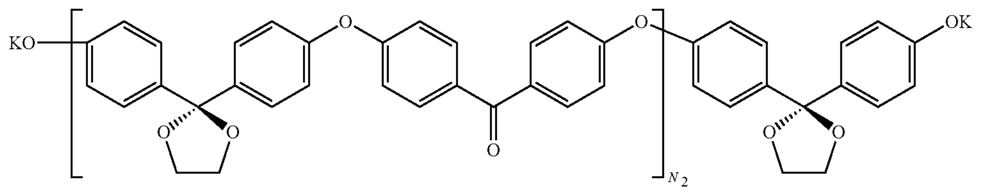

(H3-3)

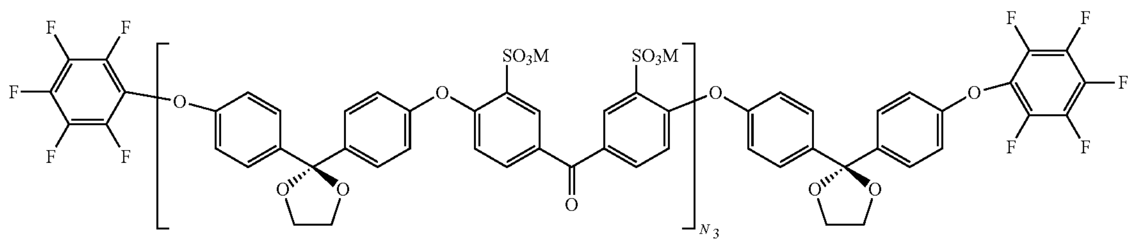

(H3-4)

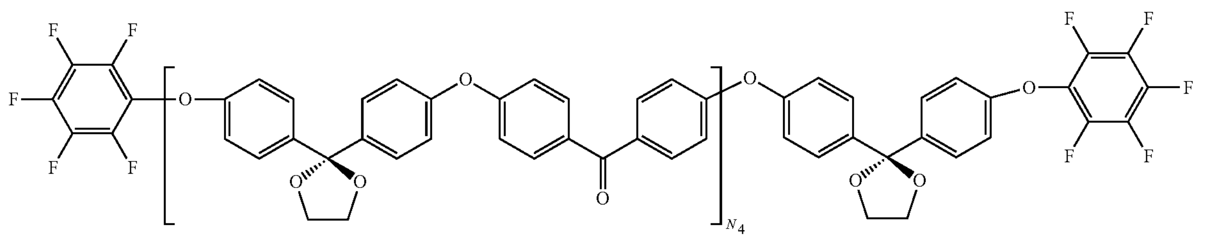

In the general formulae (H3-1) to (H3-4), N1, N2, N3, and N4 independently represent an integer of 1 to 200.

In cases where the ionic segment has a linker (L1), specific examples of the compound that gives the ionic segment obtained by the step (1), and having a linker site introduced thereinto include a structure represented by the following general formula (H3-1L), and furthermore, specific examples in which the second linker is introduced into both ends include a structure represented by the following general formula (H3-3L). In cases where the nonionic segment has a linker (L1), specific examples of the compound that gives the nonionic segment obtained by the step (1), and having a linker site introduced thereinto include a structure represented by the following general formula (H3-2L), and furthermore, specific examples in which the second linker is introduced into both ends include a structure represented by the following general formula (H3-4L). However, the present invention is not limited to these.

[Chem. 22]

(H3-1L)

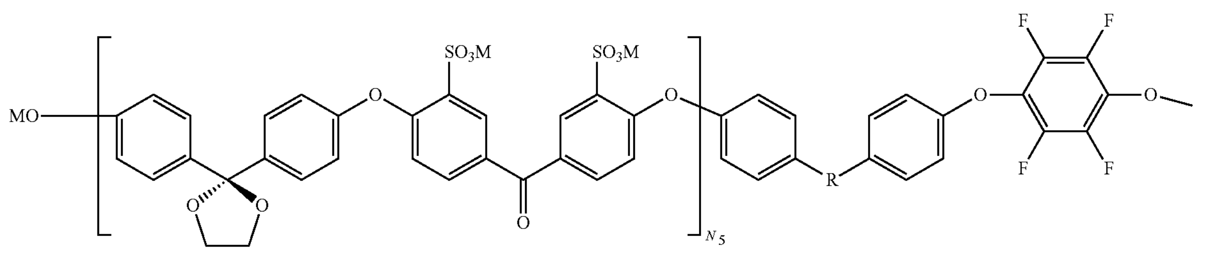

-continued
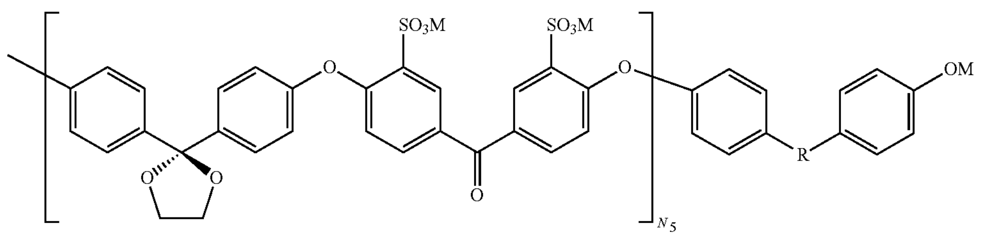
(H3-3L)
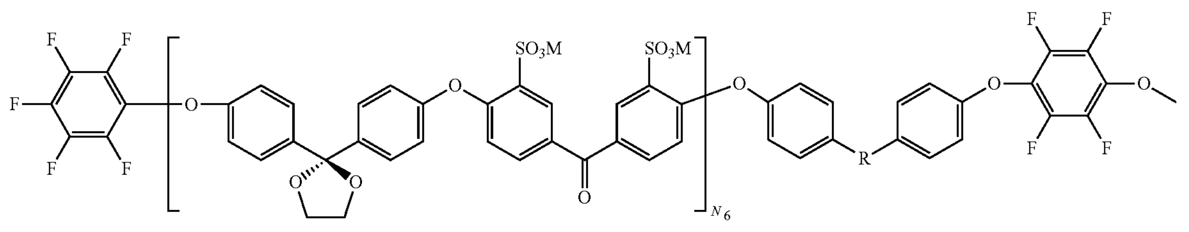
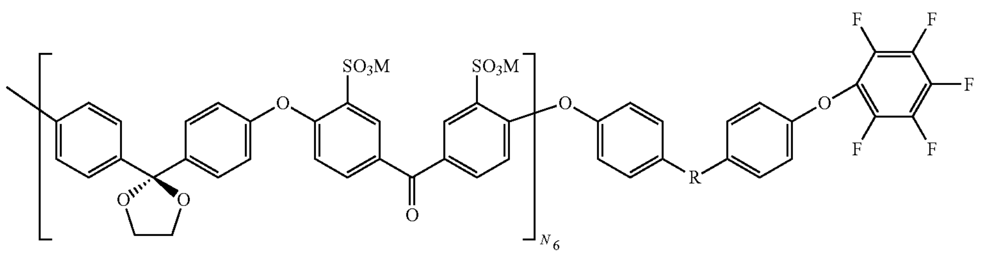
(H3-2L)
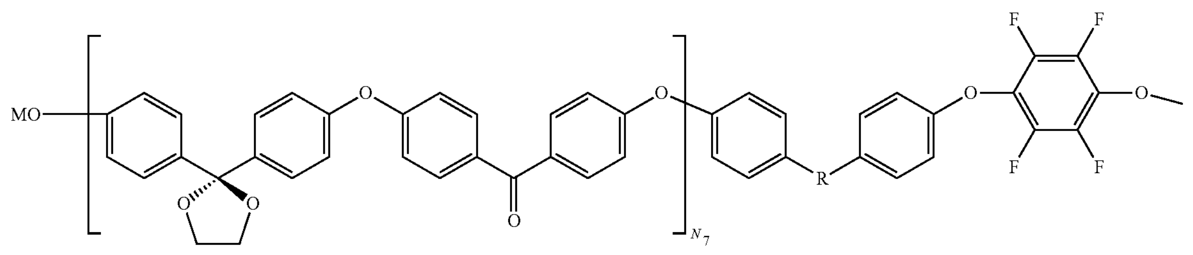
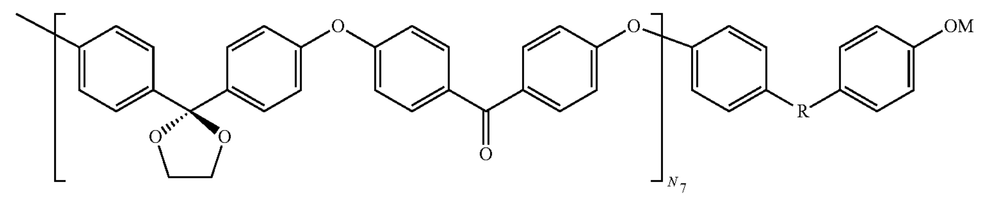
(H3-4L)
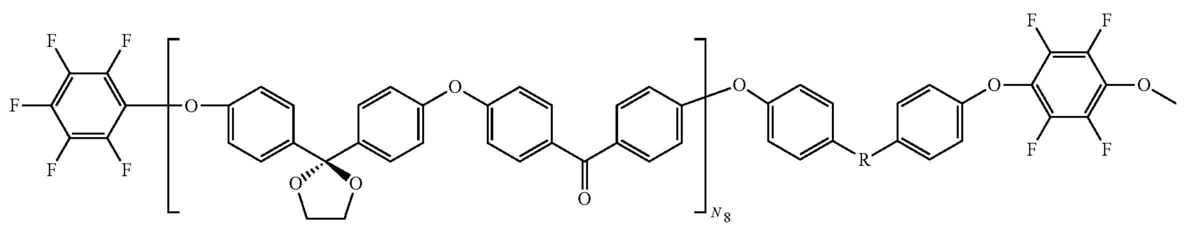

-continued

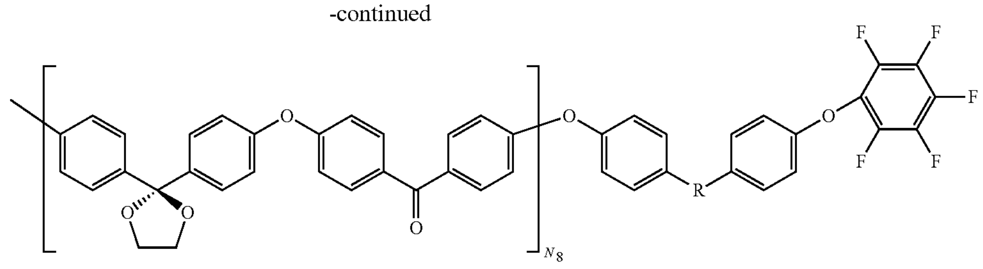

In the general formulae (H3-1L) to (H3-4L), N5, N6, N7, and N8 independently represent an integer of 1 to 200.

In the general formulae (H3-1) to (H3-4) and (H3-1L) to (H3-4L), a halogen atom is represented by F, a —OM end group is represented by a —OK group, and an alkali metal is represented by one of Na and K, but the components can be used without limitation to these. In addition, these formulae are inserted in order to help the readers' understanding, and do not always accurately represent the chemical structures, accurate compositions, and arrangements of the polymerization components of a polymer and the position, number, molecular weight, and the like of a sulfonic group. The materials are not limited to these formulae.

Furthermore, in the general formulae (H3-1) to (H3-4) and (H3-1L) to (H3-4L), a ketal group is introduced as a protective group into each of the segments, but in the present invention, a protective group can be introduced into a component having high crystalline and low solubility. Accordingly, the above-described ionic segment does not always need a protective group, and an ionic segment having no protective group can be preferably used from the viewpoints of durability and dimensional stability.

A block copolymer according to the present invention preferably has a phase-separation structure. The phase-separation structure can be formed through controlling the length of the molecular chain of each of the ionic segment and the nonionic segment, the state of aggregation of the segments, and the shape of the aggregation. Examples of the form of the phase-separation structure include a cylindrical structure, sea-island structure, lamellar structure, and co-continuous structure. Among these, the co-continuous structure is preferable. The block copolymer having a co-continuous phase-separation structure makes it possible to form a three-dimensionally continuous proton conduction channel, and thus, achieve excellent proton conductivity. In addition, a nonionic hydrophobic segment forms a three-dimensional continuous domain in the same manner, and thus, has excellent fuel-blocking capability, solvent resistance, dimensional stability, mechanical strength, and physical durability.

Whether the block copolymer has a phase-separation structure can be verified by coating a support base material with a solution in which the block copolymer is dissolved or dispersed in a suitable solvent, drying the solution, and analyzing the resulting "membrane" by transmission electron microscopy (TEM), small-angle X-ray scattering (SAXS), atomic force microscopy (AFM), or the like.

In addition, a polymer electrolyte material, molded polymer electrolyte product, and polymer electrolyte membrane that each contain a block copolymer according to the present invention preferably has a phase-separation structure, particularly preferably has a co-continuous phase-separation structure. The details will be mentioned below.

(Molded Polymer Electrolyte Product)

A block copolymer according to the present invention is suitable as a polymer electrolyte material, and can be processed in the form of a molded polymer electrolyte product. The form of the above-described molded product is not particularly limited, and is, for example, a binder, fiber, membrane, rod, or the like in the catalyst layer of an electrode. Among these, a membrane and a binder are preferable, and a membrane is particularly preferable. The above-described molded product preferably has a phase-separation structure, particularly preferably has a co-continuous phase-separation structure.

(Polymer Electrolyte Membrane)

A polymer electrolyte membrane produced using a block copolymer according to the present invention as an electrolyte material preferably has a phase-separation structure, particularly preferably has a co-continuous phase-separation structure. The phase-separation structure can be analyzed by transmission electron microscopy (TEM), small-angle X-ray scattering (SAXS), atomic force microscopy (AFM), or the like as above-described.

For a molded polymer electrolyte product and a polymer electrolyte membrane that are each produced using a block copolymer according to the present invention, it is preferable that the phase-separation structure is recognized when observed by TEM at 50,000 times, and that the average period size metered by image processing is 8 nm or more and 300 nm or less. Among these, the average period size is more preferably 10 nm or more and 200 nm or less, most preferably 15 nm or more and 150 nm or less. The period size refers to the period length of a domain formed by aggregation of ionic segments and a domain formed by aggregation of nonionic segments.

In cases where a block copolymer according to the present invention is molded into a membrane, a possible method is a method in which a membrane is formed from a solution in a stage in which the polymer has a protective group such as a ketal; a method in which a membrane is formed from the molten polymer; and the like. The former method is, for example, a method in which the polymer electrolyte material is dissolved in a solvent such as N-methyl-2-pyrrolidone, the resulting solution is applied by cast coating to a glass plate or the like, and the solvent is removed to give a membrane.

A solvent to be used to form a membrane is desirably a solvent that can dissolve a block copolymer, and then removed. Examples of the solvent to be used suitably include: aprotic polar solvents such as N,N-dimethylacetoamide, N,N-dimethylformamide, N-methyl-2-pyrrolidone, dimethyl sulfoxide, sulfolane, 1,3-dimethyl-2-imidazolidinone, and hexamethylphosphon triamide; ester solvents such as γ-butyrolactone and butyl acetate; carbonate solvents such as ethylene carbonate and propylene carbonate; alkylene glycol monoalkyl ethers such as ethylene glycol monomethyl ether, ethylene glycol monoethyl ether, propylene glycol monomethyl ether, and propylene glycol monoethyl ether; alcohol solvents such as isopropanol; water; and mixtures thereof. Aprotic polar solvents have the highest solubility, and are preferable. In addition, to increase the solubility of the ionic segment, a crown ether such as 18-crown-6 is suitably added.

In addition, in cases where a solution is formed into a membrane using a block copolymer in the present invention, the selection of a solvent is important with respect to the phase-separation structure, and using a mixture of an aprotic polar solvent and a solvent having low polarity is a suitable method.

A method in which a polymer solution prepared so as to have a required solid concentration is filtrated by normal pressure filtration, pressure filtration, or the like to remove foreign matter from the polymer electrolyte solution is preferable to afford a tough membrane. A filter medium to be used here is subject to no particular limitation, and is suitably a glass filter or a metallic filter.

In the filtration, the minimum pore diameter that allows the polymer solution to pass through the filter is preferably 1 μm or less.

Examples of a method of converting a block copolymer according to the present invention to a polymer electrolyte membrane include a method in which a membrane constituted of the block copolymer is formed by the above-described technique, and then, at least part of the sites protected with protective groups are deprotected. For example, in cases where the material has ketal sites as protective groups, at least part of the ketone sites protected with ketals are deprotected to be restored to ketone sites. This method makes it possible to form a membrane with a solution of a block copolymer lacking in solubility, and to achieve proton conductivity together with mechanical strength and physical durability.

In addition, molding an electrolyte membrane in a state in which the ionic group contained is in the form a salt with a cation of an alkali metal or an alkaline earth metal may be followed by a step in which the cation of the alkali metal or the alkaline earth metal is exchanged with a proton. This step is preferably a step in which a membrane molded is brought in contact with an acidic aqueous solution, more preferably, in particular, a step in which a membranemolded is immersed in an acidic aqueous solution. In this step, the proton in the acidic aqueous solution is substituted with the cation that is ionically bonded to the ionic group, and residual water-soluble impurities, residual monomers, solvents, residual salts, and the like are simultaneously removed.

The acidic aqueous solution is not particularly limited, and sulfuric acid, hydrochloric acid, nitric acid, acetic acid, trifluoromethanesulfonic acid, methanesulfonic acid, phosphoric acid, citric acid, or the like is preferably used. The temperature and concentration of the acidic aqueous solution are appropriately determined. From the viewpoint of productivity, it is preferable to use an aqueous solution of 3 mass % or more and 30 mass % or less sulfuric acid at a temperature of 0° C. or more and 80° C. or less.

The thickness of a polymer electrolyte membrane according to the present invention is more preferably 1 μm or more to obtain the mechanical strength and physical durability of a membrane suitable for practical use, and is preferably 2,000 μm or less to decrease the resistance of the membrane, that is, to enhance the power generation performance. The still more preferable range of the thickness of the membrane is 3 μm or more and 200 μm or less. The thickness of the membrane can be controlled on the basis of the concentration of the solution or the thickness of the coating on the base plate.

In addition, a polymer electrolyte membrane in the present invention may contain an additive to be used for an ordinary polymer compound, such as a crystallization nucleating agent, plasticizer, stabilizer, antioxidant, or mold release agent to the extent that is not contrary to an object of the present invention.

In addition, for the purpose of enhancing the mechanical strength, thermal stability, processability, and the like, a polymer electrolyte membrane composed of a block copolymer obtained by the present invention may contain various kinds of polymer, elastomer, filler, microparticle, additive, and/or the like to the extent that does not adversely affect the various characteristics mentioned earlier. In addition, the polymer electrolyte membrane may be reinforced with a microporous membrane, nonwoven fabric, mesh, or the like.

A block copolymer according to the present invention is used as a polymer electrolyte material to be made into a molded polymer electrolyte product or a polymer electrolyte membrane, and thus, can be used in various applications. For example, the polymer electrolyte material can be used for medical uses such as artificial skin, filtration uses, ion-exchange resin uses such as chlorine-resistant reverse osmosis membranes, various structural material uses, electrochemical uses, humidifying membranes, antifogging films, antistatic films, deoxidation films, solar battery films, and gas barrier films. Above all, the polymer electrolyte material can be more preferably used in various electrochemical uses. Examples of the electrochemical uses include polymer electrolyte fuel cells, redox-flow batteries, water electrolysis apparatuses, chlor-alkali electrolysis apparatuses, electrochemical hydrogen pumps, and water electrolysis hydrogen generators.

In the polymer electrolyte fuel cell, electrochemical hydrogen pump, or water electrolysis hydrogen generator, the polymer electrolyte membrane is used in the form of a structure having a catalyst layer, an electrode substrate, and a separator sequentially stacked on both sides of the polymer electrolyte membrane. Among these, an electrolyte membrane on each of both sides of which a catalyst layer is stacked (that is, a laminate having a layer structure of catalyst layer/electrolyte membrane/catalyst layer) is referred to as a catalyst coated membrane (CCM). Furthermore, a laminate including a catalyst layer and a gas diffusion substrate sequentially stacked on each of both sides of the electrolyte membrane (that is, a laminate having a layer structure of gas diffusion substrate/catalyst layer/electrolyte membrane/catalyst layer/gas diffusion substrate) is referred to as a membrane electrode assembly (MEA). A block copolymer according to the present invention is particularly suitably used as a polymer electrolyte membrane that constitutes such a CCM or MEA.

EXAMPLES (1) Molecular Weight of Polymer

The number-average molecular weight and weight-average molecular weight of a polymer were measured by GPC. Using HLC-8022GPC manufactured by Tosoh Corporation as an integrated device of an ultraviolet detector and a differential refractometer, using a TSKgel Guard Column SuperH-H column (having an inner diameter of 4.6 mm and a length of 3.5 cm) manufactured by Tosoh Corporation as a guard column, and using two TSKgel SuperHM-H columns (having an inner diameter of 6.0 mm and a length of 15 cm) manufactured by Tosoh Corporation as GPC columns, the measurement was performed with an N-methyl-2-pyrrolidone solvent (N-methyl-2-pyrrolidone solvent containing 10 mmol/L lithium bromide) at a sample concentration of 0.1 wt %, at a flow rate of 0.2 mL/min, at a temperature of 40° C., and at a measuring wavelength of 265 nm, and the number-average molecular weight and the weight-average molecular weight were determined in terms of standard polystyrene.

(2) Ion Exchange Capacity (IEC)

The ion exchange capacity was measured by the neutralization titration method described in 1] to 4] below. The measurement was performed three times, and the average of the three measurements was adopted.

1] A block copolymer was subjected to proton exchange, and thoroughly washed with pure water, and water was wiped off. Then, the block copolymer was vacuum-dried at 100° C. for 12 hours or more, and the dry weight of the membrane was obtained.

2] To the block copolymer, 50 mL of an aqueous 5 wt % sodium sulfate solution was added, and the resulting mixture was left to stand for 12 hours to undergo ion exchange.

3] The sulfuric acid generated was titrated using an aqueous 0.01 mol/L sodium hydroxide solution. A commercially available 0.1 w/v % phenolphthalein solution for titration was added as an indicator, and the point at which the solution turned pale red-purple was taken as the end point.

4] The IEC was determined in accordance with the following formula.

IEC (meq/g)=[concentration (mmol/mL) of aqueous sodium hydroxide solution×dropping amount (mL) of aqueous sodium hydroxide solution]/dry weight (g) of sample (3) Rate of Dry-Wet Dimensional Change The electrolyte membrane (analyte) was cut to a 3 mm×20 mm rectangle, which was used as a sample piece. The sample piece was placed in the sample holder of a thermomechanical analyzer TMA/SS6100 (manufactured by Hitachi High-Tech Science Corporation) having an oven with a temperature and humidity regulating function, in such a manner that the long side of the sample piece was in the direction of measurement. The analyzer was set in such a manner that a stress of 20 mN was applied. In the oven, the sample was made steady at 23° C. and at 50% RH for 1 hour, and the length of this sample piece was regarded as the zero point. The temperature in the oven was fixed at 23° C., the humidity was adjusted to 30% RH (a dry condition) over a period of 30 minutes, and the sample piece was held for 20 minutes. Next, the humidity was adjusted to 90% RH (a humidified condition) over a period of 30 minutes. This dry-wet cycle (30% RH-90% RH) was regarded as one cycle, and a difference at the 10th cycle between the rate (%) of dimensional change under the 30% RH and the rate (%) of dimensional change under the 90% RH was regarded as the rate (%) of dry-wet dimensional change.

(4) Observation of Phase-Separation Structure by Transmission Electron Microscope (TEM)

A sample piece was immersed in an aqueous 2 wt % lead acetate solution as a staining agent, and left to stand at 25° C. for 72 hours. The sample stained was taken out, and embedded in an epoxy resin. An 80 nm thin piece was cut out using an ultramicrotome at room temperature, and the thin piece obtained was collected on a Cu grid to be used for TEM observation. The observation was performed at an accelerating voltage of 100 kV, and a photograph was taken at a photographic magnification of ×20,000 and ×40,000. The device used was HT7700 (manufactured by Hitachi High-Technologies Corporation).

(5) Observation of Phase-Separation Structure by Transmission Electron Microscopic (TEM) Tomography A thin piece sample made by the method described in (4) above was mounted on a collodion membrane, and observed under the following conditions.

Device: field emission electron microscope (HRTEM) JEM 2100F manufactured by JEOL Ltd.

Image-capturing: DigitalMicrograph (manufactured by Gatan, Inc.)

System: a marker method

Accelerating voltage: 200 kV

Photographic magnification: 30,000 times

Angle of tilt: +60° to −62°

Reconstruction resolution: 0.71 nm/pixel

The marker method was applied to the three-dimensional reconstruction process. An alignment marker used for performing three-dimensional reconstruction was Au colloidal particles provided on a collodion film. Using the marker as a reference, the sample was tilted in 1° steps in the range of from +61° to −62°, and TEM images were taken. On the basis of a total of 124 TEM images obtained from the continuous tilt image series, a CT reconstruction process was performed, and a three-dimensional phase-separation structure was observed.

(6) Proton Conductivity

A carbon paste (G7711, manufactured by EM Japan Co., Ltd.) based on isopropanol was applied to a platinum electrode of a cell, and onto the carbon paste, a diffusion layer electrode (ELAT GDL 140-HT, manufactured by E-TEK) cut to 18 mm×6 mm was attached. An electrolyte membrane cut to 30 mm×8 mm was disposed between the electrodes of the cell, and the cell was fastened at 1 MPa, and housed in the chamber of MTS740. The proton resistance of the electrolyte membrane in the direction of the thickness of the membrane was evaluated using an MTS740 membrane resistance measurement system (manufactured by Scribner Associates Inc.). In the MTS740, the cell was housed in the chamber with the temperature controlled, and air gas was supplied to the chamber through a humidifier using a mass flow controller. To the cell, a frequency response analyzer PSM1735 (manufactured by Newtons4th Ltd.) was connected, and it was possible that the resistance was determined with the A/C signal swept from 1 MHz to 1 KHz.

MTS740 and PSM1735 were connected to a personal computer, and were controllable with software. The temperature in the chamber was set at 80° C., then air gas at 90% RH was supplied to the chamber, and the cell was held for 1 hour to wet the electrolyte membrane sufficiently. Then, air at 20% RH was supplied to dry the cell, air at 30% RH was supplied, the cell was held for 30 minutes, and the resistance was measured. When this was done, the frequency was swept from 1 MHz to 1 KHz. Then, air at 80% RH was supplied, the cell was held for 30 minutes, and the resistance was measured in the same manner. From the data of the resistance measured, a Cole-Cole plot was prepared. The frequency band at and around 1 MHz is influenced by the inductance component of a cable connecting the cell to PSM1735, and thus, a value on the real axis at 200 kHz, at which the influence is smaller, was regarded as the resistance value (52). The proton conductivity determined when air at 30% RH was supplied was regarded as a low-humidity proton conductivity, and the proton conductivity determined when air at 80% RH was supplied was regarded as a high-humidity proton conductivity. The resistance values measured were used to calculate the proton conductivity in accordance with the following equation.

Proton conductivity (mS/cm)=1/(resistance value (Ω)×active area ($cm^2$)/thickness of sample (cm))

Synthesis Example 1 (Synthesis of 2,2-bis(4-hydroxyphenyl)-1,3-dioxolane (K-DHBP) Represented by the Following Formula (G1))

In a 500 mL flask equipped with a stirrer, a thermometer, and a distillation tube, 49.5 g of 4,4'-dihydroxybenzophenone, 134 g of ethylene glycol, 96.9 g of trimethyl orthoformate, and 0.50 g of p-toluenesulfonic acid monohydrate were fed to obtain a solution. Then, the solution was stirred for 2 hours at a temperature kept at 78 to 82° C. Further, the internal temperature was gradually raised to 120° C., and kept at 120° C. until the distillation of methyl formate, methanol, and trimethyl orthoformate completely stopped. After the reaction liquid was cooled to room temperature, the reaction liquid was diluted with ethyl acetate. The organic layer was washed with 100 mL of an aqueous 5% potassium carbonate solution, the resulting liquid was then separated, and the solvent was distilled away. To the residue, 80 mL of dichloromethane was added to deposit crystals, and the crystals were filtrated and dried to give 52.0 g of 2,2-bis(4-hydroxyphenyl)-1,3-dioxolane. The compound had a purity of 99.9%.

[Chem. 23]

(G1)

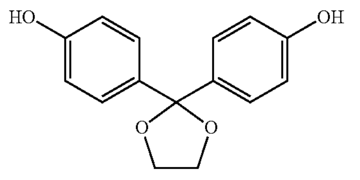

Synthesis Example 2 (Synthesis of disodium-3,3'-disulfonate-4,4'-difluorobenzophenone Represented by the Following Formula (G2))

In 150 mL of fuming sulfuric acid (50% $SO_3$) (a Wako Pure Chemical reagent), 109.1 g of 4,4'-difluorobenzophenone (an Aldrich reagent) was allowed to react at 100° C. for 10 hours. Then, the resulting product was gradually poured into a large amount of water, the resulting mixture was neutralized with NaOH, and then 200 g of sodium chloride (NaCl) was added to the mixture to precipitate a synthesized product. The precipitate obtained was filtrated off and recrystallized from an aqueous ethanol solution to give disodium-3,3'-disulfonate-4,4'-difluorobenzophenone. The compound had a purity of 99.3%.

[Chem. 24]

(G2)

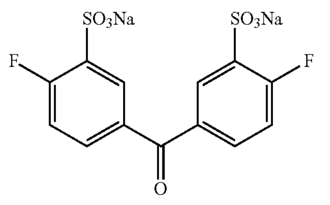

Synthesis Example 3 (Synthesis of disodium diphenylsulfone-4,4'-difluoro-3,3'-disulfonate Represented by the Following Formula (G3))

In 150 mL of fuming sulfuric acid (50% $SO_3$) (a Wako Pure Chemical reagent), 109.1 g of 4,4-difluorodiphenyl sulfone (an Aldrich reagent) was allowed to react at 100° C. for 10 hours. Then, the resulting product was gradually poured into a large amount of water, the resulting mixture was neutralized with NaOH, and then 200 g of sodium chloride was added to the mixture to precipitate a synthesized product. The precipitate obtained was filtrated off and recrystallized from an aqueous ethanol solution to give disodium diphenylsulfone-4,4'-difluoro-3,3'-disulfonate. The compound had a purity of 99.3%.

[Chem. 25]

(G3)

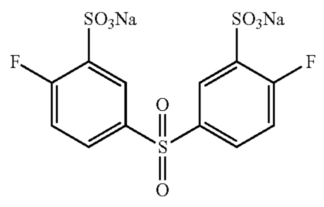

Example 1

(Synthesis of Nonionic Oligomer a1 Represented by the Following General Formula (G4))

Into a 2,000 mL SUS polymerizer equipped with a stirrer, a nitrogen introduction tube, and a Dean-Stark trap, 16.59 g of potassium carbonate (an Aldrich reagent, 120 mmol), 25.83 g (100 mmol) of K-DHBP obtained in Synthesis Example 1, and 21.38 g of 4,4'-difluorobenzophenone (an Aldrich reagent, 98 mmol) were introduced. After the device was purged with nitrogen, 300 mL of N-methylpyrrolidone (NMP) and 100 mL of toluene were added, the resulting mixture was dehydrated at 150° C., the temperature was raised to remove toluene, and the mixture was polymerized at 170° C. for 3 hours. The resulting product was purified by reprecipitation in a large amount of methanol to obtain a nonionic oligomer a1 having a hydroxy end. The number-average molecular weight of this nonionic oligomer a1 having a hydroxy end was 20,000.

Into a 500 mL three-necked flask equipped with a stirrer, a nitrogen introduction tube, and a Dean-Stark trap, 1.1 g of potassium carbonate (an Aldrich reagent, 8 mmol) and 20.0 g (1 mmol) of the nonionic oligomer a1 having a hydroxy end were introduced. After the device was purged with nitrogen, 100 mL of NMP and 30 mL of toluene were added, the resulting mixture was dehydrated at 100° C., and the temperature was raised to remove toluene. Furthermore, 1.1 g of hexafluorobenzene (an Aldrich reagent, 6 mmol) was introduced, and the resulting mixture was allowed to react at 105° C. for 12 hours. The resulting product was purified by reprecipitation in a large amount of isopropyl alcohol to obtain a nonionic oligomer a1 (having a fluoro end group) represented by the following general formula (G4). The number-average molecular weight of this nonionic oligomer a1 was 21,000. In the general formula (G4), m represents an integer of 1 or greater.

[Chem. 26]

(G4)

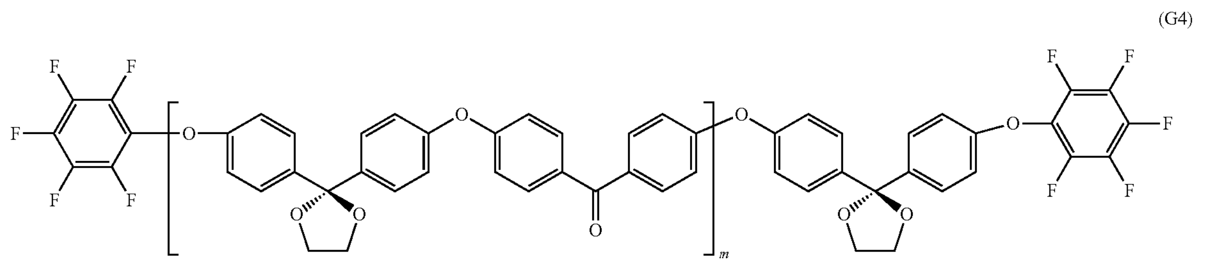

(Synthesis of Ionic Oligomer a2 Represented by the Following General Formula (G5))

Into a 2,000 mL SUS polymerizer equipped with a stirrer, a nitrogen introduction tube, and a Dean-Stark trap, 27.64 g of potassium carbonate (an Aldrich reagent, 200 mmol), 12.91 g (50 mmol) of K-DHBP obtained in Synthesis Example 1, 9.31 g of 4,4'-biphenol (an Aldrich reagent, 50 mmol), 41.60 g (98.5 mmol) of disodium-3,3'-disulfonate-4,4'-difluorobenzophenone obtained in Synthesis Example 2, and 26.40 g of 18-crown-6 (Wako Pure Chemical Industries, Ltd., 100 mmol) were introduced. After the device was purged with nitrogen, 300 mL of NMP and 100 mL of toluene were added, the resulting mixture was dehydrated at 150° C., the temperature was raised to remove toluene, and the mixture was polymerized at 170° C. for 6 hours. The resulting product was purified by reprecipitation in a large amount of isopropyl alcohol to obtain an ionic oligomer a2 (having a hydroxy end group) represented by the following general formula (G5). The number-average molecular weight of this ionic oligomer a2 was 45,000. In this regard, in the general formula (G5), M represents a hydrogen atom, Na, or K, and n represents an integer of 1 or greater.

[Chem. 27]

(G5)

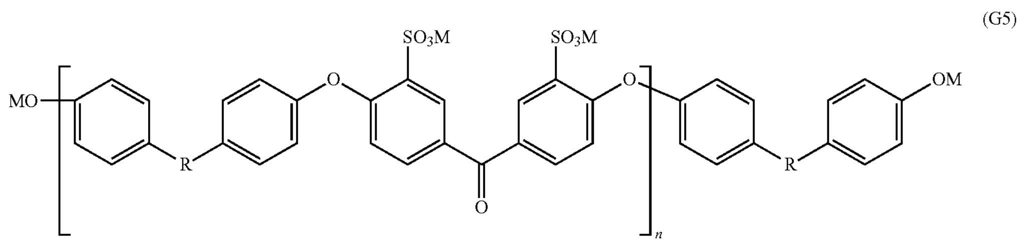

R = 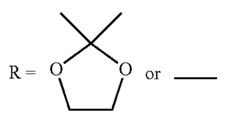 or ——

(Synthesis of Ionic Oligomer a2' Represented by the Following General Formula (G6))

Into a 2,000 mL SUS polymerizer equipped with a stirrer, a nitrogen introduction tube, and a Dean-Stark trap, 0.56 g of potassium carbonate (an Aldrich reagent, 400 mmol) and 49.0 g of the ionic oligomer a2 were introduced. After the device was purged with nitrogen, 500 mL of NMP was added, the contents were dissolved at 60° C., and then, 19.8 g of a hexafluorobenzene/NMP solution (1 wt %) was added. The resulting mixture was allowed to react at 80° C. for 18 hours to obtain an NMP solution containing an ionic oligomer a2' (having an OM end) represented by the general formula (G6). The number-average molecular weight of this ionic oligomer a2' was 90,000. In this regard, in the general formula (G6), M represents a hydrogen atom, Na, or K, and n represents an integer of 1 or greater.

[Chem. 28]

(G6)

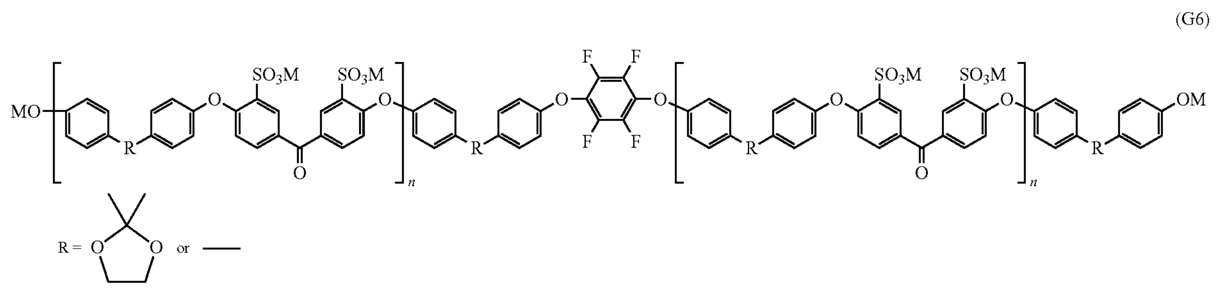

(Synthesis of Block Copolymer b1 Containing Oligomer a2' as Ionic Segment and Oligomer a1 as Nonionic Segment)

In a 2,000 mL SUS polymerizer equipped with a stirrer, a nitrogen introduction tube, and a Dean-Stark trap, 49.0 g of the ionic oligomer a2' and 7.65 g of the nonionic oligomer a1 were introduced, NMP was added in such a manner that the total amount of the oligomers fed was 7 wt %, and the resulting mixture was allowed to react at 105° C. for 24 hours. The resulting product was reprecipitated in a large amount of an isopropyl alcohol/NMP solution mixture (at a ratio of 2/1 by weight), and purified in a large amount of isopropyl alcohol to obtain a block copolymer b1. This block copolymer b1 had a number-average molecular weight of 170,000 and a weight-average molecular weight of 410,000.

A 20 wt % NMP solution in which the resulting block copolymer b1 was dissolved was filtrated under pressure using a glass fiber filter, then applied to a glass base plate by cast coating, and dried at 100° C. for 4 hours to obtain a molded membrane product. This molded product was immersed in an aqueous 10 mass % sulfuric acid solution at 80° C. for 24 hours to undergo proton exchange and deprotection reaction, and then immersed in a large excess amount of pure water for 24 hours to be thoroughly washed, to obtain a polymer electrolyte membrane A (having a thickness of 10 μm). Observation by TEM and TEM tomography made it possible to verify a co-continuous phase-separation structure, and demonstrated that the hydrophilic domain containing an ionic group and the hydrophobic domain containing no ionic group each formed a continuous phase.

Example 2

(Synthesis of Nonionic Oligomer a3 Represented by General Formula (G4))

An oligomer a3 having a hydroxy end was obtained in the same manner as the oligomer a1 having a hydroxy end was synthesized except that the amount of 4,4'-difluorobenzophenone used was 21.45 g. The number-average molecular weight of this oligomer a3 having a hydroxy end was 25,000.

A nonionic oligomer a3 (having a fluoro end group) represented by the general formula (G4) was obtained in the same manner as the oligomer a1 was synthesized except that 25.0 g of the oligomer a3 having a hydroxy end was used in place of the oligomer a1 having a hydroxy end. The number-average molecular weight of this nonionic oligomer a3 was 26,000.

(Synthesis of Block Copolymer b2 Containing Oligomer a2' as Ionic Segment and Oligomer a3 as Nonionic Segment)

A block copolymer b2 was obtained in the same manner as the block copolymer b1 was synthesized except that the nonionic oligomer a3 (12.3 g) was used in place of the nonionic oligomer a1 (7.65 g). This block copolymer b3 had a number-average molecular weight of 160,000 and a weight-average molecular weight of 390,000.

A polymer electrolyte membrane B (having a thickness of 10 μm) was obtained by the same method as in Example 1 except that the block copolymer b2 was used in place of the block copolymer b1. Observation by TEM and TEM tomography made it possible to verify a co-continuous phase-separation structure, and demonstrated that the hydrophilic domain containing an ionic group and the hydrophobic domain containing no ionic group each formed a continuous phase.

Example 3

(Synthesis of Nonionic Oligomer a1' Represented by the Following General Formula (G7))

Into a 500 mL three-necked flask equipped with a stirrer, a nitrogen introduction tube, and a Dean-Stark trap, 1.1 g of potassium carbonate (an Aldrich reagent, 8 mmol) and 20.0 g (1 mmol) of the nonionic oligomer a1 were introduced. After the device was purged with nitrogen, 100 mL of NMP and 30 mL of toluene were added, the resulting mixture was dehydrated at 100° C., and the temperature was raised to remove toluene. Then, 0.84 g of 2,6-difluorobenzonitrile (an Aldrich reagent, 6 mmol) was introduced, and allowed to react at 105° C. for 12 hours. The resulting product was purified by reprecipitation in a large amount of isopropyl alcohol to obtain a nonionic oligomer a1' (having a fluoro end group) represented by the following general formula (G7). The number-average molecular weight of this non-ionic oligomer a1' was 21,000. In this regard, m represents an integer of 1 or greater in the general formula (G7).

[Chem. 29]

(G7)

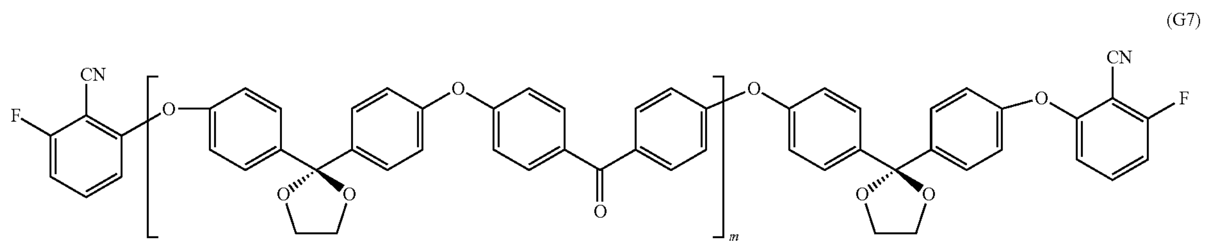

(Synthesis of Ionic Oligomer a4 Represented by General Formula (G5))

An ionic oligomer a4 was obtained in the same manner as the ionic oligomer a2 was synthesized except that the amount of disodium-3,3'-disulfonate-4,4'-difluorobenzophenone used was 41.38 g (98.0 mmol). The number-average molecular weight of this ionic oligomer a4 was 35,000.

(Synthesis of Ionic Oligomer a4' Represented by the Following General Formula (G8))

Into a 2,000 mL SUS polymerizer equipped with a stirrer, a nitrogen introduction tube, and a Dean-Stark trap, 0.56 g of potassium carbonate (an Aldrich reagent, 400 mmol) and 37.16 g of the oligomer a4 containing an ionic group were introduced. After the device was purged with nitrogen, 400 mL of NMP was added, the contents were dissolved at 60° C., and then, 11.4 g of a 2,6-difluorobenzonitrile/NMP solution (1 wt %) was added. The resulting mixture was allowed to react at 80° C. for 18 hours to obtain an NMP solution containing an ionic oligomer a4' (having an OM end) represented by the general formula (G8). The number-average molecular weight of this ionic oligomer a4' was 70,000. In this regard, in the general formula (G8), M represents a hydrogen atom, Na, or K, and n represents an integer of 1 or greater.

[Chem. 30]

(G8)

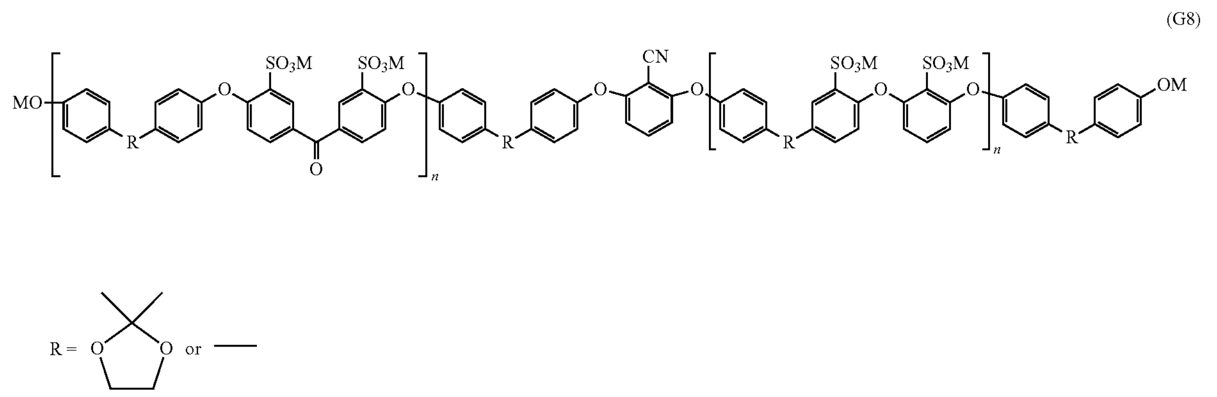

(Synthesis of Block Copolymer b3 Containing Oligomer a4' as Ionic Segment and Oligomer a1 as Nonionic Segment)

A block copolymer b3 was obtained in the same manner as the block copolymer b1 was synthesized except that the ionic oligomer a4' (37.16 g) was used in place of the ionic oligomer a2' (49.0 g), and that the amount of the nonionic oligomer a1' used was 5.80 g. This block copolymer b3 had a number-average molecular weight of 100,000 and a weight-average molecular weight of 260,000.

A polymer electrolyte membrane C (having a thickness of 10 μm) was obtained by the same method as in Example 1 except that the block copolymer b3 was used in place of the block copolymer b1. Observation by TEM and TEM tomography made it possible to verify a co-continuous phase-separation structure, and demonstrated that the hydrophilic domain containing an ionic group and the hydrophobic domain containing no ionic group each formed a continuous phase.

Example 4

(Synthesis of Nonionic Oligomer a5 Represented by the Following General Formula (G9))

An oligomer a5 having a hydroxy end was obtained in the same manner as the oligomer a1 having a hydroxy end was synthesized except that 4,4'-difluorodiphenyl sulfone (24.92 g) was used in place of 4,4'-difluorobenzophenone. The number-average molecular weight of this oligomer a5 having a hydroxy end was 20,000.

A nonionic oligomer a5 (having a fluoro end group) represented by the general formula (G9) was obtained in the same manner as the oligomer a1 was synthesized except that the oligomer a5 having a hydroxy end was used in place of the oligomer a1 having a hydroxy end. The number-average molecular weight of this nonionic oligomer a5 was 21,000. In this regard, m represents an integer of 1 or greater in the general formula (G9).

[Chem. 31]

(G9)

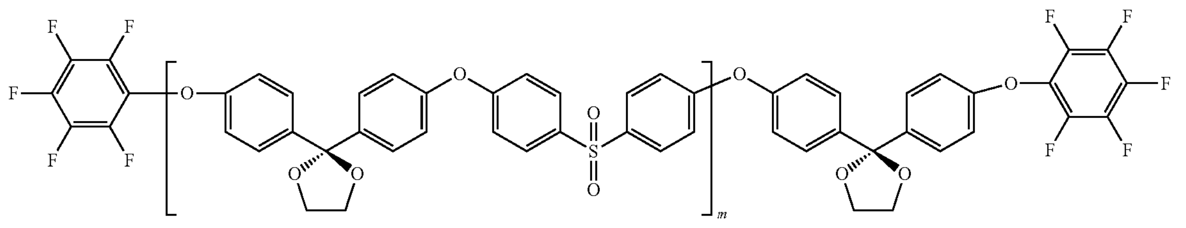

(Synthesis of Ionic Oligomer a6 Represented by the Following General Formula (G10))

An ionic oligomer a6 (having a hydroxy end group) represented by the general formula (G10) was obtained in the same manner as the ionic oligomer a2 was synthesized except that 44.94 g (98.1 mmol) of disodium diphenylsulfone-4,4'-difluoro-3,3'-disulfonate obtained in Synthesis Example 3 was used in place of 41.60 g of disodium-3,3'-disulfonate-4,4'-difluorobenzophenone. The number-average molecular weight of this ionic oligomer a6 was 41,000. In this regard, in the general formula (G10), M represents a hydrogen atom, Na, or K, and n represents an integer of 1 or greater.

[Chem. 32]

(G10)

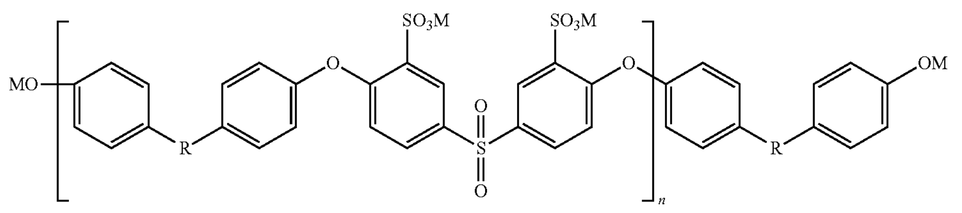

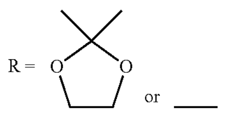

(Synthesis of Ionic Oligomer a6' Represented by the Following General Formula (G11))

An NMP solution containing the ionic oligomer a6' (having an OM end) represented by the general formula (G11) was obtained in the same manner as the ionic oligomer a2' was synthesized except that the ionic oligomer a6 (45.76 g) was used in place of the ionic oligomer a2 (49.0 g), and that 16.35 g of 2,6-difluorobenzonitrile/NMP solution (1 wt %) was used in place of 19.8 g of the hexafluorobenzene/NMP solution (1 wt %). The number-average molecular weight of this ionic oligomer a6' was 82,000. In this regard, in the general formula (G11), M represents a hydrogen atom, Na, or K, and n represents an integer of 1 or greater.

[Chem. 33]

(G11)

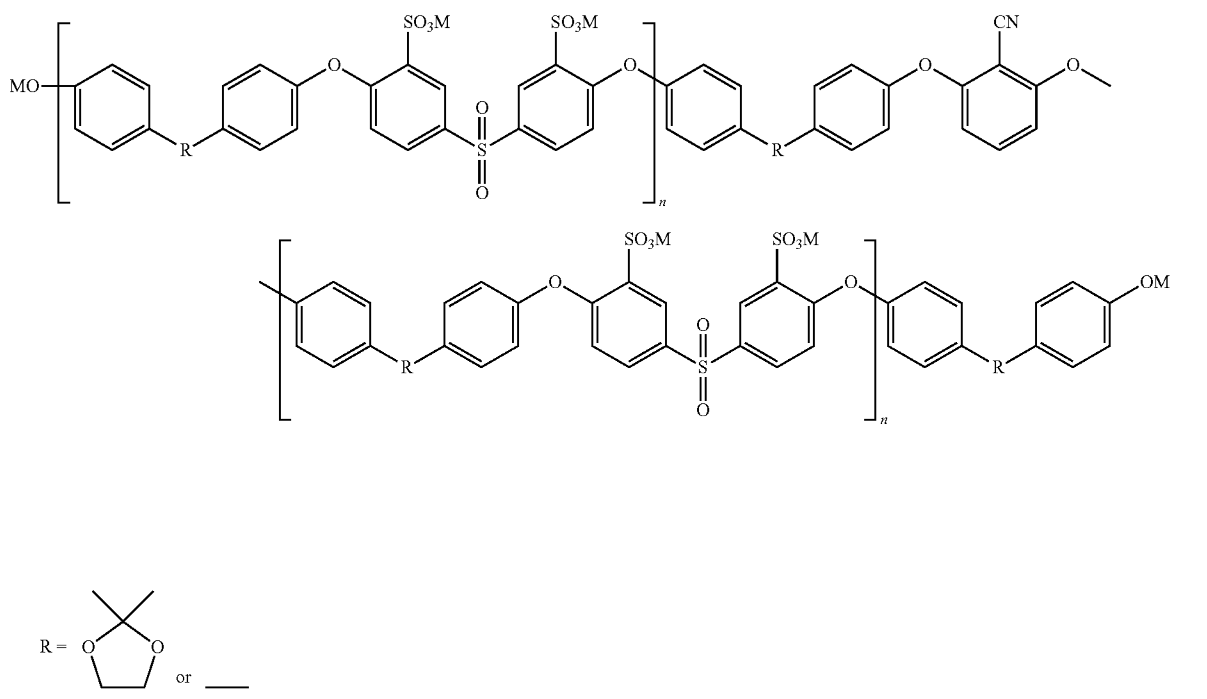

or (Synthesis of Block Copolymer b4 Containing Oligomer a6' as Ionic Segment and Oligomer a5 as Nonionic Segment)

A block copolymer b4 was obtained in the same manner as the block copolymer b1 was synthesized except that the ionic oligomer a6' (45.76 g) was used in place of the ionic oligomer a2' (49.0 g), and that the nonionic oligomer a5 (13.12 g) was used in place of the nonionic oligomer a1 (7.65 g). This block copolymer b4 had a number-average molecular weight of 160,000 and a weight-average molecular weight of 380,000.

A polymer electrolyte membrane D (having a thickness of 12 μm) was obtained by the same method as in Example 1 except that the block copolymer b4 was used in place of the block copolymer b1. Observation by TEM and TEM tomography made it possible to verify a co-continuous phase-separation structure, and demonstrated that the hydrophilic domain containing an ionic group and the hydrophobic domain containing no ionic group each formed a continuous phase.

Example 5

(Synthesis of Ionic Oligomer Precursor a7 Represented by the Following General Formula (G12))

Into a 2,000 mL SUS polymerizer equipped with a stirrer, a nitrogen introduction tube, and a Dean-Stark trap, 200 mL of dried N,N-dimethylacetoamide (DMAc), 16.9 g (42 mmol) of neopentyl 3-(2,5-dichlorobenzoyl)benzenesulfonate, and 0.09 g (0.7 mmol) of 4-chlorophenol were introduced, and the resulting mixture was stirred at 80° C. under a nitrogen atmosphere for 2 hours. Then, 30 g (109 mmol) of bis(1,5-cyclooctadiene)nickel was added, and the resulting mixture was stirred for 4 hours. The mixture was diluted with 300 mL of dried DMAc, and into the resulting solution, 1 L of acetone was poured. The resulting mixture was solidified, and dried in vacuo at 80° C. to obtain an ionic oligomer precursor a7 (having a hydroxy end group) represented by the following general formula (G12). The number-average molecular weight was 22,000. In this regard, n represents an integer of 1 or greater in the general formula (G12).

[Chem. 34]

(G12)

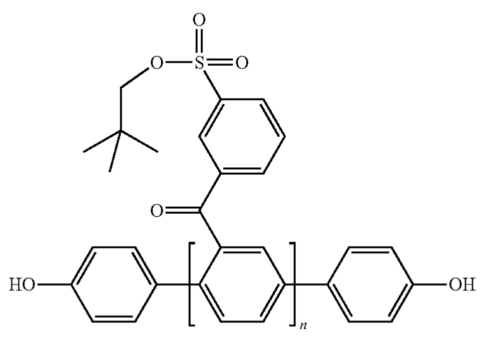

[Chem. 35]

(Synthesis of Ionic Oligomer Precursor a7' Represented by the Following General Formula (G13))

Into a 2,000 mL SUS polymerizer equipped with a stirrer, a nitrogen introduction tube, and a Dean-Stark trap, 0.56 g of potassium carbonate (an Aldrich reagent, 400 mmol) and 11.1 g of the ionic oligomer a12 were introduced. After the device was purged with nitrogen, 200 mL of dried DMAc was added, the contents were dissolved at 60° C., and then, 30.6 g of a hexafluorobenzene/DMAc solution (1 wt %) was added. The resulting mixture was allowed to react at 80° C. for 24 hours to obtain a DMAc solution containing an ionic oligomer precursor a7' (having an OM end) represented by the following formula (G13). The number-average molecular weight of the ionic oligomer precursor a7' was 67,000. In this regard, in the general formula (G13), M represents a hydrogen atom, Na, or K, and n represents an integer of 1 or greater.

(G13)

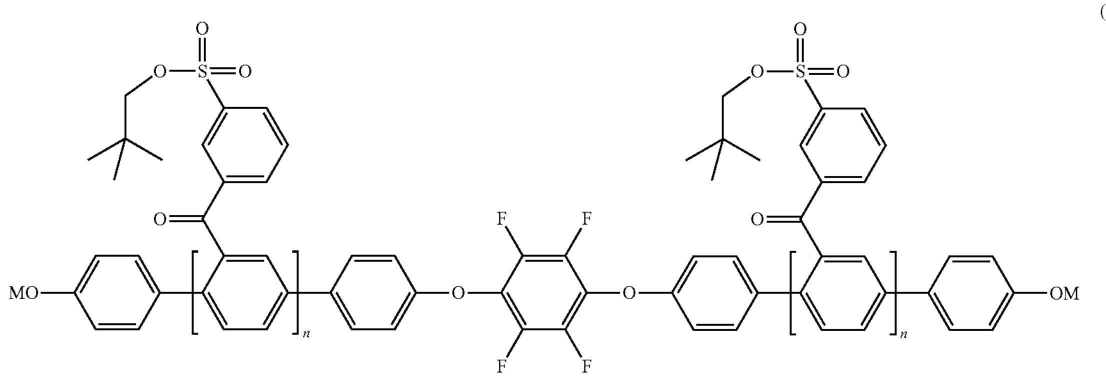

(Synthesis of Nonionic Oligomer a8 Represented by the Following General Formula (G14))

Into a 2,000 mL SUS polymerizer equipped with a stirrer, a nitrogen introduction tube, and a Dean-Stark trap, 200 mL of dried NMP, 10.08 g (40 mmol) of 2,5-dichlorobenzophenone, and 0.12 g (0.9 mmol) of 4-chlorophenol were introduced, and the resulting mixture was stirred at 80° C. under a nitrogen atmosphere for 2 hours. Furthermore, 30 g (109 mmol) of bis(1,5-cyclooctadiene)nickel was added, and the resulting mixture was stirred for 4 hours. The mixture was diluted with 300 mL of dried NMP, and precipitated in 1 L of an aqueous 10 wt % hydrochloric acid solution, and then dried in vacuo at 80° C. to obtain a nonionic oligomer a8 having a hydroxy end and represented by the following general formula (G14). The number-average molecular weight was 9,000.

A nonionic oligomer a8 (having a fluoro end group) represented by the following general formula (G14) was obtained in the same manner as the nonionic oligomer a1 was synthesized except that 9.0 g (1 mmol) of the nonionic oligomer a8 having a hydroxy end was used in place of 20.0 g of the nonionic oligomer a1 having a hydroxy end. The number-average molecular weight of this nonionic oligomer a8 was 10,000. In this regard, m represents an integer of 1 or greater in the general formula (G14).

[Chem. 36]

(G14)

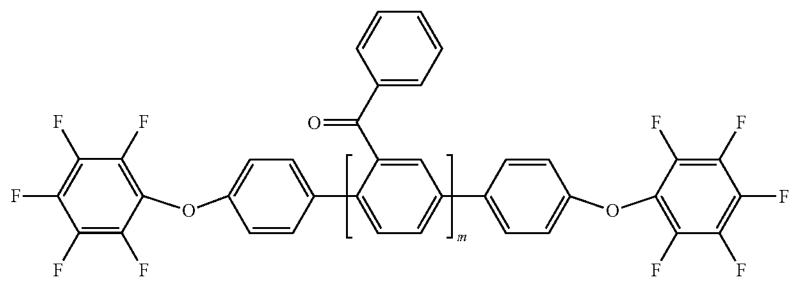

(Synthesis of Block Copolymer b5 Containing Ionic Oligomer a7" as Ionic Segment and Oligomer a8 as Nonionic Segment, and Represented by the Following General Formula (G15))

In a 2,000 mL SUS polymerizer equipped with a stirrer, a nitrogen introduction tube, and a Dean-Stark trap, 11.1 g of the ionic oligomer precursor a7' and 5.71 g of the nonionic oligomer a8 were introduced, DMAc was added in such a manner that the total amount of the oligomers fed was 7 wt %, and the resulting mixture was allowed to react at 105° C. for 24 hours. The polymerization reaction solution was diluted with 500 mL of DMAc, stirred for 30 minutes, and filtrated using Celite as a filter aid.

The filtrate was concentrated with an evaporator, 21.9 g (0.253 mol) of lithium bromide was added to the residue, and the resulting mixture was allowed to react at an internal temperature of 110° C. under a nitrogen atmosphere for 7 hours. After the reaction, the mixture was cooled to room temperature, poured into 3 L of acetone, and solidified. The product solidified was collected by filtration, air-dried, pulverized with a mixer, and washed with 1,500 mL of 1 N hydrochloric acid with stirring. After filtration, the product was washed with ion-exchanged water until the washing liquid came to have a pH of 5 or more. Then, the product was dried at 80° C. overnight to obtain a block copolymer b5 having an ionic oligomer a7" represented by the following general formula (G15). The number-average molecular weight of the ionic oligomer a7" was calculated at 53,000 from the structural formula and number-average molecular weight of the ionic oligomer precursor a7' represented by the general formula (G13). The block copolymer b5 had a number-average molecular weight of 90,000 and a weight-average molecular weight of 210,000. In this regard, in the general formula (G15), the symbol * represents a bond with a nonionic segment, and n represents an integer of 1 or greater.

[Chem. 37]

(G15)

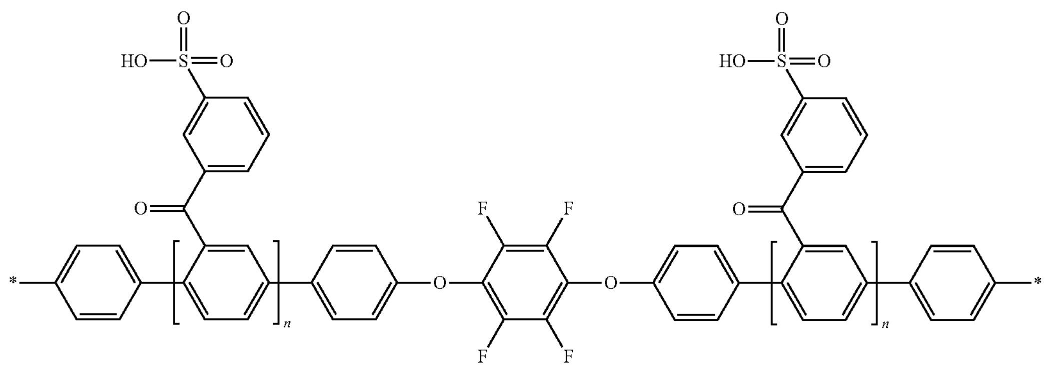

The block copolymer b5 was dissolved at 0.1 g/g in a solvent composed of NMP/methanol=30/70 (mass %). The resulting solution was filtrated under pressure using a glass fiber filter, then applied to a glass base plate by cast coating, and dried at 100° C. for 4 hours to obtain a molded membrane product. This molded product was immersed in an aqueous 10 mass % sulfuric acid solution at 80° C. for 24 hours, and then immersed in a large excess amount of pure water for 24 hours to be thoroughly washed, to obtain a polymer electrolyte membrane E (having a thickness of 10 μm). Observation by TEM and TEM tomography made it possible to verify a co-continuous phase-separation structure, and demonstrated that the hydrophilic domain containing an ionic group and the hydrophobic domain containing no ionic group each formed a continuous phase.

Comparative Example 1

(Synthesis of Nonionic Oligomer a9 Represented by General Formula (G4))

A nonionic oligomer a9 having a hydroxy end was obtained in the same manner as the nonionic oligomer a1 having a hydroxy end was synthesized except that the amount of 4,4'-difluorobenzophenone used was 20.84 g. The number-average molecular weight of this nonionic oligomer a9 having a hydroxy end was 9,000.

A nonionic oligomer a9 (having a fluoro end group) represented by the general formula (G4) was obtained in the same manner as the nonionic oligomer a1 was synthesized except that 9.0 g (1 mmol) of the nonionic oligomer a9 having a hydroxy end was used in place of 20.0 g of the nonionic oligomer a1 having a hydroxy end. The number-average molecular weight of this nonionic oligomer a9 was 10,000.

(Synthesis of Ionic Oligomer a10 Represented by General Formula (G5))

Into a 2,000 mL SUS polymerizer equipped with a stirrer, a nitrogen introduction tube, and a Dean-Stark trap, 27.64 g of potassium carbonate (an Aldrich reagent, 200 mmol), 12.91 g (50 mmol) of K-DHBP obtained in Synthesis Example 1, 9.31 g of 4,4'-biphenol (an Aldrich reagent, 50 mmol), 41.47 g (98.2 mmol) of disodium-3,3'-disulfonate-4,4'-difluorobenzophenone obtained in Synthesis Example 2, and 26.40 g of 18-crown-6 (Wako Pure Chemical Industries, Ltd., 100 mmol) were introduced. After the device was purged with nitrogen, 300 mL of NMP and 100 mL of toluene were added, the resulting mixture was dehydrated at 150° C., the temperature was raised to remove toluene, and the mixture was polymerized at 170° C. for 6 hours. The resulting product was purified by reprecipitation in a large amount of isopropyl alcohol to obtain an ionic oligomer a10 (having a hydroxy end group) represented by the general formula (G5). The number-average molecular weight of this ionic oligomer a10 was 42,000.

(Synthesis of Block Copolymer b6 Containing Oligomer a10 as Ionic Segment and Oligomer a9 as Nonionic Segment)

A block copolymer b6 was obtained in the same manner as the block copolymer b1 was synthesized except that the ionic oligomer a10 (43.57 g) was used in place of the ionic oligomer a2' (49.0 g), and that the nonionic oligomer a9 (10.89 g) was used in place of the nonionic oligomer a1 (7.65 g). This block copolymer b6 had a number-average molecular weight of 140,000 and a weight-average molecular weight of 400,000.

A polymer electrolyte membrane F (having a thickness of 10 μm) was obtained by the same method as in Example 1 except that the block copolymer b6 was used in place of the block copolymer b1. Observation by TEM and TEM tomography made it possible to verify a co-continuous phase-separation structure, and demonstrated that the hydrophilic domain containing an ionic group and the hydrophobic domain containing no ionic group each formed a continuous phase.

Comparative Example 2

(Synthesis of Nonionic Oligomer all Represented by General Formula (G4))

A nonionic oligomer all having a hydroxy end was obtained in the same manner as the nonionic oligomer a1 having a hydroxy end was synthesized except that the amount of 4,4'-difluorobenzophenone used was 20.18 g. The number-average molecular weight of this nonionic oligomer all having a hydroxy end was 5,000.

Into a 500 mL three-necked flask equipped with a stirrer, a nitrogen introduction tube, and a Dean-Stark trap, 2.2 g of potassium carbonate (an Aldrich reagent, 16 mmol) and 10.0 g of the nonionic oligomer all having a hydroxy end were introduced. After the device was purged with nitrogen, 100 mL of NMP and 30 mL of toluene were introduced, the resulting mixture was dehydrated at 100° C., the temperature was raised to remove toluene, 2.2 g of hexafluorobenzene (an Aldrich reagent, 12 mmol) was added, and the resulting mixture was allowed to react at 105° C. for 12 hours. The resulting product was purified by reprecipitation in a large amount of isopropyl alcohol to obtain a nonionic oligomer a11 (having a fluoro end group) represented by the general formula (G4). The number-average molecular weight of this nonionic oligomer a11 was 6,000.

(Synthesis of Block Copolymer b7 Containing Oligomer a10 as Ionic Segment and Oligomer a11 as Nonionic Segment)

A block copolymer b7 was obtained in the same manner as the block copolymer b6 was synthesized except that the nonionic oligomer a11 (6.81 g) was used in place of the nonionic oligomer a9 (10.89 g). This block copolymer b7 had a number-average molecular weight of 130,000 and a weight-average molecular weight of 400,000.

A polymer electrolyte membrane G (having a thickness of 10 μm) was obtained by the same method as in Example 1 except that the block copolymer b7 was used in place of the block copolymer b1. Observation by TEM and TEM tomography made it possible to verify a co-continuous phase-separation structure, and demonstrated that the hydrophilic domain containing an ionic group and the hydrophobic domain containing no ionic group each formed a continuous phase, but a non-continuous structure was partially found.

Comparative Example 3

(Synthesis of Nonionic Oligomer a12 Represented by General Formula (G9))

A nonionic oligomer a12 having a hydroxy end was obtained in the same manner as the nonionic oligomer a1 having a hydroxy end was synthesized except that 23.65 g of 4,4-difluorodiphenyl sulfone was used in place of 4,4'-difluorobenzophenone. The number-average molecular weight of this nonionic oligomer a12 having a hydroxy end was 10,000.

A nonionic oligomer a12 (having a fluoro end group) represented by the general formula (G9) was obtained in the same manner as the nonionic oligomer a1 was synthesized except that 10.0 g of the nonionic oligomer a12 having a hydroxy end was used in place of 20.0 g of the nonionic oligomer a1 having a hydroxy end. The number-average molecular weight of this nonionic oligomer a12 was 11,000.

(Synthesis of Block Copolymer b8 Containing Oligomer a6 as Ionic Segment and Oligomer a12 as Nonionic Segment)

In a 2,000 mL SUS polymerizer equipped with a stirrer, a nitrogen introduction tube, and a Dean-Stark trap, 45.76 g of the ionic oligomer a6 and 8.93 g of the nonionic oligomer a12 were introduced, NMP was added in such a manner that the total amount of the oligomers fed was 7 wt %, and the resulting mixture was allowed to react at 105° C. for 24 hours. The resulting product was reprecipitated in a large amount of an isopropyl alcohol/NMP solution mixture (at a ratio of 2/1 by weight), and purified in a large amount of isopropyl alcohol to obtain a block copolymer b8. This block copolymer b8 had a number-average molecular weight of 120,000 and a weight-average molecular weight of 290,000.

A polymer electrolyte membrane H (having a thickness of 10 μm) was obtained by the same method as in Example 1 except that the block copolymer b8 was used in place of the block copolymer b1. Observation by TEM and TEM tomography made it possible to verify a co-continuous phase-separation structure, and demonstrated that the hydrophilic domain containing an ionic group and the hydrophobic domain containing no ionic group each formed a continuous phase.

Example 6

(Synthesis of Nonionic Oligomer a13 (Having a Hydroxy End Group) Represented by the Following General Formula (G16))

Into a 2,000 mL SUS polymerizer equipped with a stirrer, a nitrogen introduction tube, and a Dean-Stark trap, 16.59 g of potassium carbonate (an Aldrich reagent, 120 mmol), 25.83 g (100 mmol) of K-DHBP obtained in Synthesis Example 1, and 20.79 g of 4,4'-difluorobenzophenone (an Aldrich reagent, 95.2 mmol) were introduced. After the device was purged with nitrogen, 300 mL of N-methylpyrrolidone (NMP) and 100 mL of toluene were added, the resulting mixture was dehydrated at 150° C., the temperature was raised to remove toluene, and the mixture was polymerized at 170° C. for 3 hours. The resulting product was purified by reprecipitation in a large amount of methanol to obtain a nonionic oligomer a13 (having a hydroxy end group). The number-average molecular weight of this nonionic oligomer a13 (having a hydroxy end group) was 8,000. In this regard, in the general formula (G16), M represents a hydrogen atom, Na, or K, and m represents an integer of 1 or greater.

[Chem. 38]

(G16)

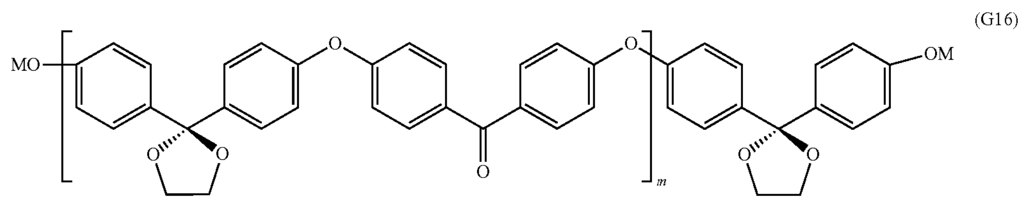

(Synthesis of Nonionic Oligomer a14 (Having a Hydroxy End Group) Represented by the Following General Formula (G17))

Into a 2,000 mL SUS polymerizer equipped with a stirrer, a nitrogen introduction tube, and a Dean-Stark trap, 0.56 g of potassium carbonate (an Aldrich reagent, 400 mmol) and 50.0 g of the nonionic oligomer a14 were introduced. After the device was purged with nitrogen, 500 mL of NMP was added, the contents were dissolved at 60° C., and then, 58.1 g of a hexafluorobenzene/NMP solution (1 wt %) was added. The resulting mixture was allowed to react at 80° C. for 18 hours to obtain an NMP solution containing a nonionic oligomer a14 (having a hydroxy end group) represented by the general formula (G17). The number-average molecular weight of this ionic oligomer a2' was 16,000. In this regard, in the general formula (G17), M represents a hydrogen atom, Na, or K, and m represents an integer of 1 or greater.

[Chem. 39]

(G17)

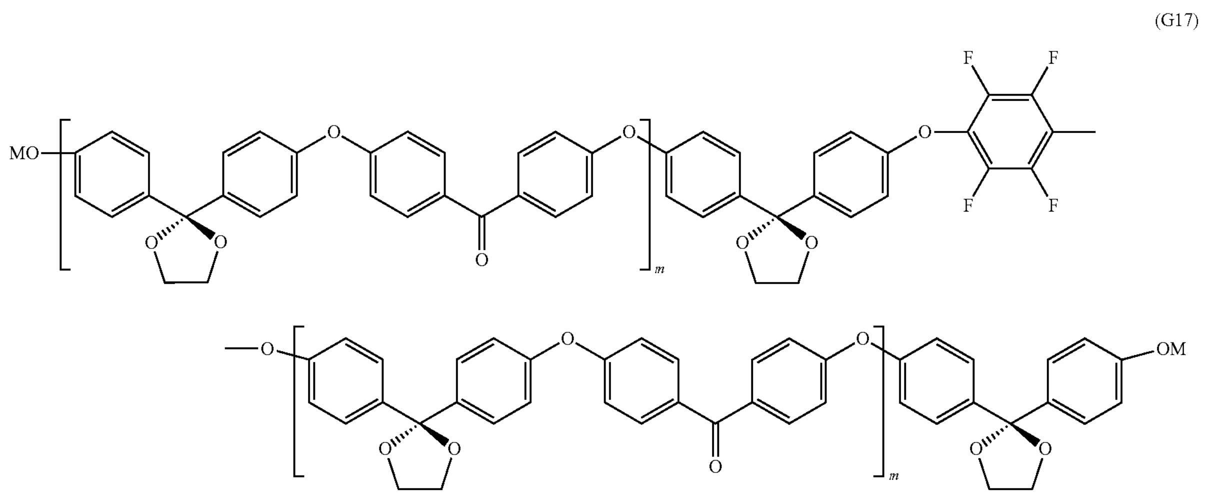

(Synthesis of Nonionic Oligomer a15 (Having a Fluoro End Group) Represented by the Following General Formula (G18))

Into a 500 mL three-necked flask equipped with a stirrer, a nitrogen introduction tube, and a Dean-Stark trap, 1.1 g of potassium carbonate (an Aldrich reagent, 8 mmol) and 16.0 g (1 mmol) of the nonionic oligomer a14 (having a hydroxy end group) were introduced. After the device was purged with nitrogen, 100 mL of NMP and 30 mL of toluene were added, the resulting mixture was dehydrated at 100° C., and the temperature was raised to remove toluene. Furthermore, 1.1 g of hexafluorobenzene (an Aldrich reagent, 6 mmol) was introduced, and the resulting mixture was allowed to react at 105° C. for 12 hours. The resulting product was purified by reprecipitation in a large amount of isopropyl alcohol to obtain a nonionic oligomer a15 having a fluoro end group) represented by the following general formula (G18). The number-average molecular weight of this nonionic oligomer a15 was 17,000. In this regard, m represents an integer of 1 or greater in the general formula (G18).

[Chem. 40]

(G18)

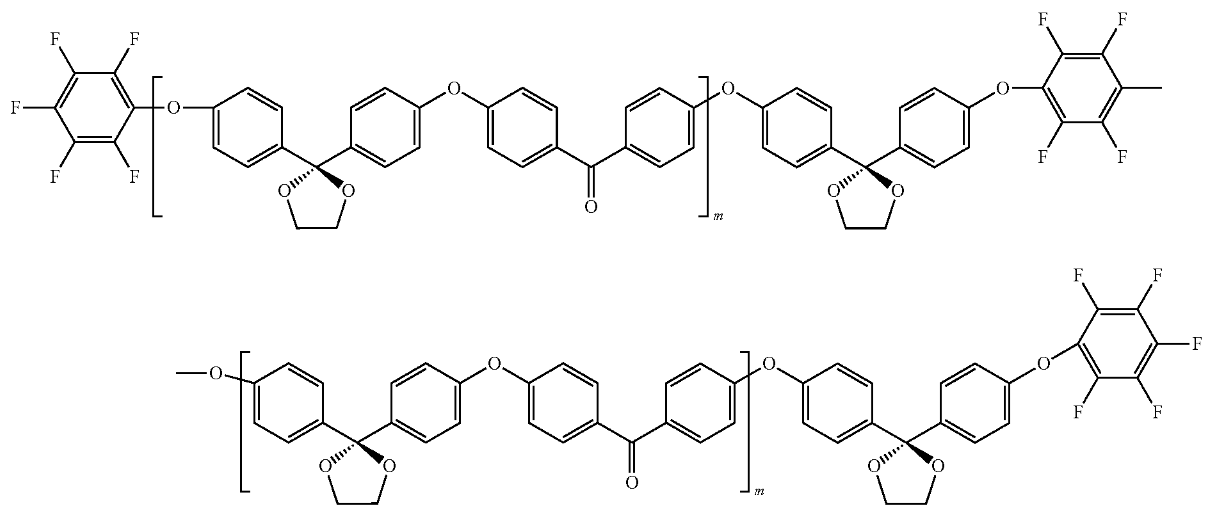

(Synthesis of Ionic Oligomer a16 Represented by General Formula (G5))

Into a 2,000 mL SUS polymerizer equipped with a stirrer, a nitrogen introduction tube, and a Dean-Stark trap, 27.64 g of potassium carbonate (an Aldrich reagent, 200 mmol), 12.91 g (50 mmol) of K-DHBP obtained in Synthesis Example 1, 9.31 g of 4,4'-biphenol (an Aldrich reagent, 50 mmol), and 41.85 g (99.1 mmol) of disodium-3,3'-disulfonate-4,4'-difluorobenzophenone obtained in Synthesis Example 2 were introduced. After the device was purged with nitrogen, 300 mL of dimethyl sulfoxide (DMSO) and 100 mL of toluene were added, the resulting mixture was dehydrated at 133° C., and the temperature was raised to remove toluene. The mixture was polymerized at 150° C. for 2 hours, heated to 155° C., and further polymerized for 1 hour. The resulting product was purified by reprecipitation in a large amount of isopropyl alcohol to obtain an ionic oligomer a16 (having a hydroxy end group) represented by the general formula (G5). The number-average molecular weight of this ionic oligomer a16 was 56,000.

(Synthesis of Block Copolymer b9 Containing Oligomer a16 as Ionic Segment and Oligomer a15 as Nonionic Segment)

A block copolymer b9 was obtained in the same manner as the block copolymer b1 was synthesized except that the ionic oligomer a16 (49.0 g) was used in place of the ionic oligomer a2' (49.0 g), and that the nonionic oligomer a15 (12.3 g) was used in place of the nonionic oligomer a1 (7.65 g). This block copolymer b9 had a number-average molecular weight of 170,000 and a weight-average molecular weight of 390,000.

A polymer electrolyte membrane I (having a thickness of 10 μm) was obtained by the same method as in Example 1 except that the block copolymer b9 was used in place of the block copolymer b1. Observation by TEM and TEM tomography made it possible to verify a co-continuous phase-separation structure, and demonstrated that the hydrophilic domain containing an ionic group and the hydrophobic domain containing no ionic group each formed a continuous phase.

Example 7

(Synthesis of Nonionic Oligomer a17 (Having a Hydroxy End Group) Represented by General Formula (G16))

A nonionic oligomer a17 (having a hydroxy end group) was obtained in the same manner as the nonionic oligomer a13 (having a hydroxy end group) was synthesized except that the amount of 4,4'-difluorobenzophenone used was 20.88 g. The number-average molecular weight of this nonionic oligomer a17 (having a hydroxy end group) was 10,000.

(Synthesis of Nonionic Oligomer a18 (Having a Hydroxy End Group) Represented by General Formula (G17))

A nonionic oligomer a18 (having a hydroxy end group) was obtained in the same manner as the nonionic oligomer a14 (having a hydroxy end group) was synthesized except that the amount of the hexafluorobenzene/NMP solution (1 wt %) used was 46.5 g. The number-average molecular weight of this nonionic oligomer a18 (having a hydroxy end group) was 20,000.

(Synthesis of Nonionic Oligomer a19 (Having a Fluoro End Group) Represented by General Formula (G18))

A nonionic oligomer a19 (having a fluoro end group) represented by the general formula (G18) was obtained in the same manner as the nonionic oligomer a15 (having a fluoro end group) was synthesized except that 20.0 g (1 mmol) of the nonionic oligomer a18 (having a hydroxy end group) was used in place of 16.0 g of the nonionic oligomer a14 (having a hydroxy end group). The number-average molecular weight of this nonionic oligomer a19 was 21,000.

(Synthesis of Block Copolymer b10 Containing Oligomer a16 as Ionic Segment and Oligomer a19 as Nonionic Segment)

A block copolymer b10 was obtained in the same manner as the block copolymer b1 was synthesized except that the ionic oligomer a16 (49.0 g) was used in place of the ionic oligomer a2' (49.0 g), and that the nonionic oligomer a19 (17.3 g) was used in place of the nonionic oligomer a1 (7.65 g). This block copolymer b10 had a number-average molecular weight of 170,000 and a weight-average molecular weight of 380,000.

A polymer electrolyte membrane J (having a thickness of 10 μm) was obtained by the same method as in Example 1 except that the block copolymer b10 was used in place of the block copolymer b1. Observation by TEM and TEM tomography made it possible to verify a co-continuous phase-separation structure, and demonstrated that the hydrophilic domain containing an ionic group and the hydrophobic domain containing no ionic group each formed a continuous phase.

Example 8

(Synthesis of Nonionic Oligomer a20 (Having a Hydroxy End Group) Represented by General Formula (G16))

A nonionic oligomer a20 (having a hydroxy end group) was obtained in the same manner as the nonionic oligomer a13 (having a hydroxy end group) was synthesized except that the amount of 4,4'-difluorobenzophenone used was 21.18 g. The number-average molecular weight of this nonionic oligomer a20 (having a hydroxy end group) was 15,000.

(Synthesis of Nonionic Oligomer a21 (Having a Hydroxy End Group) Represented by General Formula (G17))

A nonionic oligomer a21 (having a hydroxy end group) was obtained in the same manner as the nonionic oligomer a14 (having a hydroxy end group) was synthesized except that the amount of the hexafluorobenzene/NMP solution (1 wt %) used was 31.0 g. The number-average molecular weight of this nonionic oligomer a21 (having a hydroxy end group) was 30,000.

(Synthesis of Nonionic Oligomer a22 (Having a Fluoro End Group) Represented by General Formula (G18))

A nonionic oligomer a22 (having a fluoro end group) represented by the general formula (G18) was obtained in the same manner as the nonionic oligomer a15 (having a fluoro end group) was synthesized except that 30.0 g (1 mmol) of the nonionic oligomer a21 (having a hydroxy end group) was used in place of 16.0 g of the nonionic oligomer a14 (having a hydroxy end group). The number-average molecular weight of this nonionic oligomer a22 was 31,000.

(Synthesis of Block Copolymer b11 Containing Oligomer a2' as Ionic Segment and Oligomer a22 as Nonionic Segment)

A block copolymer b11 was obtained in the same manner as the block copolymer b1 was synthesized except that the nonionic oligomer a22 (15.0 g) was used in place of the nonionic oligomer a1 (7.65 g). This block copolymer b11 had a number-average molecular weight of 180,000 and a weight-average molecular weight of 390,000.

A polymer electrolyte membrane K (having a thickness of 10 μm) was obtained by the same method as in Example 1 except that the block copolymer b11 was used in place of the block copolymer b1. Observation by TEM and TEM tomography made it possible to verify a co-continuous phase-separation structure, and demonstrated that the hydrophilic domain containing an ionic group and the hydrophobic domain containing no ionic group each formed a continuous phase.

[Results of Measurement]

The results of measurement of a block copolymer obtained in each of Examples and Comparative Examples and a polymer electrolyte membrane produced using the block copolymer are shown in Table 1.

TABLE 1

| | Electrolyte Material | | | | | Physical Properties | | | | |
|---|---|---|---|---|---|---|---|---|---|---|
| | Type | Ionic Segment Mn1 | Nonionic Segment Mn2 | Block Copolymer Mn3 | Segment Containing Linker (L1)-Structure | Type | IEC (meq/g) | Rate of Dry-Wet Dimensional Change (%) | High-Humidity Proton Conductivity (mS/cm) | Low-Humidity Proton Conductivity (mS/cm) |
| Example 1 | Block Copolymer b1 | 90,000 | 21,000 | 170,000 | Ionic | Polymer Electrolyte Membrane A | 2.5 | 5.4 | 17.06 | 1.46 |
| Example 2 | Block Copolymer b2 | 90,000 | 26,000 | 160,000 | Ionic | Polymer Electrolyte Membrane B | 2.1 | 3.9 | 14.11 | 1.17 |
| Example 3 | Block Copolymer b3 | 70,000 | 21,000 | 100,000 | Ionic | Polymer Electrolyte Membrane C | 2.2 | 4.4 | 12.95 | 1.05 |
| Example 4 | Block Copolymer b4 | 82,000 | 21,000 | 160,000 | Ionic | Polymer Electrolyte Membrane D | 2.1 | 5.6 | 11.49 | 1.01 |
| Example 5 | Block Copolymer b5 | 67,000 | 10,000 | 90,000 | Ionic | Polymer Electrolyte Membrane E | 2.4 | 6.8 | 11.60 | 1.07 |
| Comparative Example 1 | Block Copolymer b6 | 42,000 | 10,000 | 140,000 | — | Polymer Electrolyte Membrane F | 2.1 | 4.6 | 6.02 | 0.64 |
| Comparative Example 2 | Block Copolymer b7 | 42,000 | 6,000 | 130,000 | — | Polymer Electrolyte Membrane G | 2.4 | 6.0 | 8.22 | 0.81 |
| Comparative Example 3 | Block Copolymer b8 | 41,000 | 11,000 | 120,000 | — | Polymer Electrolyte Membrane H | 2.4 | 7.1 | 6.65 | 0.70 |
| Example 6 | Block Copolymer b9 | 56,000 | 17,000 | 170,000 | Nonionic | Polymer Electrolyte Membrane I | 2.1 | 4.5 | 9.41 | 0.94 |
| Example 7 | Block Copolymer b10 | 56,000 | 21,000 | 170,000 | Nonionic | Polymer Electrolyte Membrane J | 1.9 | 3.6 | 11.69 | 0.88 |

TABLE 1-continued

| | Electrolyte Material | | | | | Physical Properties | | | | |
|---|---|---|---|---|---|---|---|---|---|---|
| | Type | Ionic Segment Mn1 | Nonionic Segment Mn2 | Block Copolymer Mn3 | Segment Containing Linker (L1)-Structure | Type | IEC (meq/g) | Rate of Dry-Wet Dimensional Change (%) | High-Humidity Proton Conductivity (mS/cm) | Low-Humidity Proton Conductivity (mS/cm) |
| Example 8 | Block Copolymer b11 | 90,000 | 31,000 | 180,000 | Ionic + Nonionic | Polymer Electrolyte Membrane K | 2.0 | 3.6 | 13.07 | 1.01 |

Reference Example 1

Six batches of ionic segments (oligomers) having a number-average molecular weight of interest of 40,000 were synthesized by the following synthesizing method under the same conditions.

(Synthesis of Oligomers a101 to a106 Having a Constituent Unit Represented by General Formula (G5))

Into a 2,000 mL SUS polymerizer equipped with a stirrer, a nitrogen introduction tube, and a Dean-Stark trap, 27.64 g of potassium carbonate (an Aldrich reagent, 200 mmol), 12.91 g (50 mmol) of K-DHBP obtained in Synthesis Example 1, 9.31 g of 4,4'-biphenol (an Aldrich reagent, 50 mmol), 40.11 g (95.0 mmol) of disodium-3,3'-disulfonate-4,4'-difluorobenzophenone obtained in Synthesis Example 2, and 26.40 g of 18-crown-6 (Wako Pure Chemical Industries, Ltd., 100 mmol) were introduced. After the device was purged with nitrogen, 300 mL of NMP and 100 mL of toluene were added, the resulting mixture was dehydrated at 150° C., the temperature was raised to remove toluene, and the mixture was polymerized at 170° C. for 6 hours. The resulting product was purified by reprecipitation in a large amount of isopropyl alcohol to obtain an ionic oligomer a101 to a106 (having a hydroxy end group) represented by the general formula (G5). The number-average molecular weights of these oligomers a101 to a106 are shown in Table 2.

(Synthesis of Ionic Oligomers a101' to a106' Represented by General Formula (G8))

Into a 2,000 mL SUS polymerizer equipped with a stirrer, a nitrogen introduction tube, and a Dean-Stark trap, 0.56 g of potassium carbonate (an Aldrich reagent, 400 mmol) and 45.00 g of the oligomer (one of a101 to a106) having the above-described constituent unit were introduced. After the device was purged with nitrogen, 400 mL of NMP was added, the contents were dissolved at 60° C., and then, 22.0 g of a 2,6-difluorobenzonitrile/NMP solution (1 wt %) was added. The resulting solution was allowed to react at 80° C. for 10 hours, and whether 40,000 as the number-average molecular weight of interest was achieved was verified by GPC measurement. In cases where the number-average molecular weight of 40,000 was not achieved, a step was repeated until the number-average molecular weight of 40,000 was achieved, in which step 2.0 g of the 2,6-difluorobenzonitrile/NMP solution (1 wt %) was added, the resulting mixture was allowed to react at 80° C. for 2 hours, and then, the number-average molecular weight was verified by GPC measurement. Six batches were synthesized by this synthesizing method to obtain NMP solutions that contained the respective ionic oligomers a101' to a106' (having a hydroxy end group) represented by the general formula (G8).

Table 2 shows the number-average molecular weight of the oligomer obtained in each batch and the amount of the linker L1 (a 2,6-difluorobenzonitrile/NMP solution (1 wt %)) added. The number-average molecular weight of each of the ionic oligomers a101' to a106' was 40,000, which was the same as the number-average molecular weight (40,000) of interest.

Reference Example 2

Six batches of ionic segments (oligomers) having a number-average molecular weight of interest of 40,000 were synthesized by the following synthesizing method under the same conditions. Here, no linker compound was used in this synthesis.

(Synthesis of Ionic Oligomers a201 to a206 Represented by General Formula (G5))

Into a 2,000 mL SUS polymerizer equipped with a stirrer, a nitrogen introduction tube, and a Dean-Stark trap, 27.64 g of potassium carbonate (an Aldrich reagent, 200 mmol), 12.91 g (50 mmol) of K-DHBP obtained in Synthesis Example 1, 9.31 g of 4,4'-biphenol (an Aldrich reagent, 50 mmol), 41.43 g (98.1 mmol) of disodium-3,3'-disulfonate-4,4'-difluorobenzophenone obtained in Synthesis Example 2, and 26.40 g of 18-crown-6 (Wako Pure Chemical Industries, Ltd., 100 mmol) were introduced. After the device was purged with nitrogen, 300 mL of NMP and 100 mL of toluene were added, the resulting mixture was dehydrated at 150° C., the temperature was raised to remove toluene, and the mixture was polymerized at 170° C. for 6 hours. The resulting product was purified by reprecipitation in a large amount of isopropyl alcohol to obtain each of the ionic oligomers a201 to a206 (having a hydroxy end group) represented by the general formula (G5). These number-average molecular weights are shown in Table 2.

The number-average molecular weights of the ionic oligomers a201 to a206 obtained in the synthesis of the six batches varied significantly in the number-average molecular weight of interest.

TABLE 2

| | Ionic Segment | | | | | |
|---|---|---|---|---|---|---|
| | Number Average Molecular Weight of Interest | Number Average Molecular Weight of Oligomer forming Constituent Unit | | Added Amount of Linker (L1) Solution (g) | Number Average Molecular Weight of Segment (Mn1) | |
| Reference Example 1 | 40,000 | a101 | 20,000 | 28 | a101' | 40,000 |
| | 40,000 | a102 | 22,000 | 22 | a102' | 40,000 |
| | 40,000 | a103 | 18,000 | 34 | a103' | 40,000 |
| | 40,000 | a104 | 20,000 | 28 | a104' | 40,000 |
| | 40,000 | a105 | 19,000 | 30 | a105' | 40,000 |
| | 40,000 | a106 | 19,000 | 30 | a106' | 40,000 |
| Reference Example 2 | 40,000 | — | | 0 | a201 | 38,000 |
| | 40,000 | — | | 0 | a202 | 42,000 |
| | 40,000 | — | | 0 | a203 | 40,000 |
| | 40,000 | — | | 0 | a204 | 44,000 |
| | 40,000 | — | | 0 | a205 | 41,000 |
| | 40,000 | — | | 0 | a206 | 42,000 |

Reference Example 3

Ionic segments (oligomers) having a number-average molecular weight of interest of 90,000 were synthesized by the following synthesizing method.

(Synthesis of Ionic Oligomer a301 Represented by General Formula (G8))

Into a 2,000 mL SUS polymerizer equipped with a stirrer, a nitrogen introduction tube, and a Dean-Stark trap, 0.56 g of potassium carbonate (an Aldrich reagent, 400 mmol) and 45.0 g of the ionic oligomer a2 were introduced. After the device was purged with nitrogen, 500 mL of NMP was added, the contents were dissolved at 60° C., and then, 15.0 g of a 2,6-difluorobenzonitrile/NMP solution (1 wt %) was added. The resulting mixture was allowed to react at 80° C. for 18 hours to obtain an NMP solution containing an ionic oligomer a301 (having a hydroxy end group) represented by the general formula (G8). The number-average molecular weight of this ionic oligomer a301 was 90,000, which was the same as the number-average molecular weight of interest.

Reference Example 4

Ionic segments (oligomers) having a number-average molecular weight of interest of 90,000 were synthesized by the following synthesizing method. Here, no linker compound was used in this synthesis.

(Synthesis of Ionic Oligomer a401 Represented by General Formula (G5))

Into a 2,000 mL SUS polymerizer equipped with a stirrer, a nitrogen introduction tube, and a Dean-Stark trap, 27.64 g of potassium carbonate (an Aldrich reagent, 200 mmol), 12.91 g (50 mmol) of K-DHBP obtained in Synthesis Example 1, 9.31 g of 4,4'-biphenol (an Aldrich reagent, 50 mmol), 41.93 g (99.3 mmol) of disodium-3,3'-disulfonate-4,4'-difluorobenzophenone obtained in Synthesis Example 2, and 26.40 g of 18-crown-6 (Wako Pure Chemical Industries, Ltd., 100 mmol) were introduced. After the device was purged with nitrogen, 300 mL of DMSO and 100 mL of toluene were added, the resulting mixture was dehydrated at 130° C., and the temperature was raised to remove toluene. The mixture was polymerized at 150° C. for 2 hours, heated to 155° C., and further polymerized for 3 hours. The resulting product was purified by reprecipitation in a large amount of isopropyl alcohol to obtain an ionic oligomer a401 (having a hydroxy end group) represented by the general formula (G5). The number-average molecular weight of the ionic oligomer a401 obtained by this synthesis was 56,000, not making it possible to achieve a number-average molecular weight of interest of 90,000.

Reference Example 5

Six batches of nonionic segments (oligomers) having a number-average molecular weight of interest of 30,000 were synthesized by the following synthesizing method under the same conditions.

(Synthesis of Oligomers a501 to a506 Having a Constituent Unit Represented by General Formula (G16))

Into a 2,000 mL SUS polymerizer equipped with a stirrer, a nitrogen introduction tube, and a Dean-Stark trap, 16.59 g of potassium carbonate (an Aldrich reagent, 120 mmol), 25.83 g (100 mmol) of K-DHBP obtained in Synthesis Example 1, and 21.19 g of 4,4'-difluorobenzophenone (an Aldrich reagent, 97.1 mmol) were introduced. After the device was purged with nitrogen, 300 mL of N-methylpyrrolidone (NMP) and 100 mL of toluene were added, the resulting mixture was dehydrated at 150° C., the temperature was raised to remove toluene, and the mixture was polymerized at 170° C. for 3 hours. The resulting product was purified by reprecipitation in a large amount of methanol to obtain each of the nonionic oligomers a501 to a506 (having a hydroxy end group) represented by the general formula (G16). The number-average molecular weights of these oligomers a501 to a506 are shown in Table 3.

(Synthesis of Nonionic Oligomers a501' to a506' Represented by the Following General Formula (G19))

Into a 2,000 mL SUS polymerizer equipped with a stirrer, a nitrogen introduction tube, and a Dean-Stark trap, 0.56 g of potassium carbonate (an Aldrich reagent, 400 mmol) and 50.00 g of the oligomer (one of a501 to a506) having the above-described constituent unit were introduced. After the device was purged with nitrogen, 400 mL of NMP was added, the contents were dissolved at 60° C., and then, 18.0 g of a 2,6-difluorobenzonitrile/NMP solution (1 wt %) was added. The resulting solution was allowed to react at 80° C. for 8 hours, and whether 30,000 as the number-average molecular weight of interest was achieved was verified by GPC measurement. In cases where the number-average molecular weight of 30,000 was not achieved, a step was repeated until the number-average molecular weight of 30,000 was achieved, in which step 2.0 g of the 2,6-difluorobenzonitrile/NMP solution (1 wt %) was added, the resulting mixture was allowed to react at 80° C. for 2 hours, and then, the number-average molecular weight was verified by GPC measurement. Six batches were synthesized by this synthesizing method to obtain NMP solutions that contained the respective nonionic oligomers a501' to a506' (having a hydroxy end group) represented by the general formula (G19).

Table 3 shows the number-average molecular weight of the oligomer obtained in each batch and the amount of the linker L1 (a 2,6-difluorobenzonitrile/NMP solution (1 wt %)) added. The number-average molecular weight of each of the ionic oligomers a501' to a506' was 30,000, which was the same as the number-average molecular weight (30,000) of interest. In this regard, in the general formula (G19), M represents a hydrogen atom, Na, or K, and m represents an integer of 1 or greater.

[Chem. 41]

(G19)

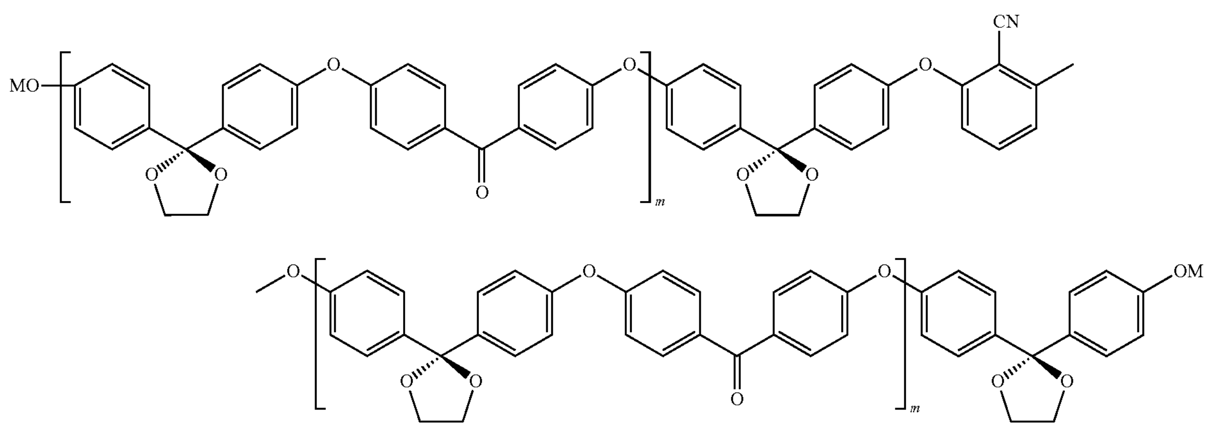

Reference Example 6

Six batches of nonionic segments (oligomers) having a number-average molecular weight of interest of 30,000 were synthesized by the following synthesizing method under the same conditions. Here, no linker compound was used in this synthesis.

(Synthesis of Ionic Oligomers a601 to a606 Represented by General Formula (G16))

Into a 2,000 mL SUS polymerizer equipped with a stirrer, a nitrogen introduction tube, and a Dean-Stark trap, 16.59 g of potassium carbonate (an Aldrich reagent, 120 mmol), 25.83 g (100 mmol) of K-DHBP obtained in Synthesis Example 1, and 21.52 g of 4,4'-difluorobenzophenone (an Aldrich reagent, 98.1 mmol) were introduced. After the device was purged with nitrogen, 300 mL of N-methylpyrrolidone (NMP) and 100 mL of toluene were added, the resulting mixture was dehydrated at 150° C., the temperature was raised to remove toluene, and the mixture was polymerized at 170° C. for 3 hours. The resulting product was purified by reprecipitation in a large amount of methanol to obtain each of the nonionic oligomers a601 to a606 (having a hydroxy end group) represented by the general formula (G16). These number-average molecular weights are shown in Table 3.

The number-average molecular weights of the ionic oligomers a601 to a606 obtained in the synthesis of the six batches varied significantly in the number-average molecular weight of interest.

TABLE 3

| | Nonionic Segment | | | | | |
|---|---|---|---|---|---|---|
| | Number Average Molecular Weight of Interest | Number Average Molecular Weight of Oligomer forming Constituent Unit | | Added Amount of Linker (L1) Solution (g) | Number Average Molecular Weight of Segment (Mn2) | |
| Reference Example 5 | 30,000 | a501 | 14,000 | 24 | a501' | 30,000 |
| | 30,000 | a502 | 15,000 | 22 | a502' | 30,000 |
| | 30,000 | a503 | 13,000 | 26 | a503' | 30,000 |
| | 30,000 | a504 | 17,000 | 18 | a504' | 30,000 |
| | 30,000 | a505 | 16,000 | 20 | a505' | 30,000 |
| | 30,000 | a506 | 15,000 | 22 | a506' | 30,000 |

TABLE 3-continued

| | Nonionic Segment | | | | |
|---|---|---|---|---|---|
| | Number Average Molecular Weight of Interest | Number Average Molecular Weight of Oligomer forming Constituent Unit | Added Amount of Linker (L1) Solution (g) | Number Average Molecular Weight of Segment (Mn2) | |
| Reference Example 6 | 30,000 | — | 0 | a601 | 33,000 |
| | 30,000 | — | 0 | a602 | 30,000 |
| | 30,000 | — | 0 | a603 | 27,000 |
| | 30,000 | — | 0 | a604 | 32,000 |
| | 30,000 | — | 0 | a605 | 31,000 |
| | 30,000 | — | 0 | a606 | 29,000 |

The invention claimed is:

1. A block copolymer comprising one or more segments containing an ionic group (hereinafter referred to as an "ionic segment(s)") and one or more segments containing no ionic group (hereinafter referred to as a "nonionic segment(s)"), wherein at least one of said ionic segment or said nonionic segment contains: constituent units each composed of an aromatic hydrocarbon polymer (hereinafter referred to as a "constituent unit"); and a first linker that links said constituent units with each other.

2. The block copolymer according to claim 1, wherein the ionic segment comprises said constituent units and said first linker that links said constituent units with each other.

3. The block copolymer according to claim 1, wherein said first linker is represented by any one of the following general formulae (M1) to (M8);

[Chem. 1]

(M1)

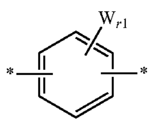

(M2)

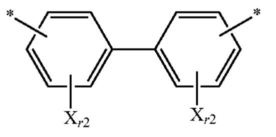

(M3)

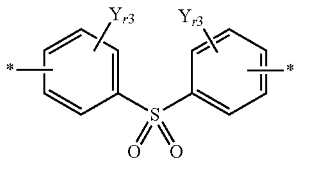

(M4)

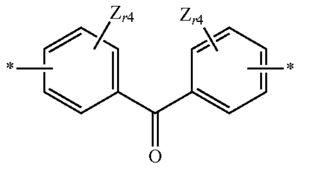

(M5)

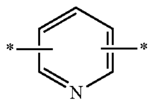

-continued (M6)

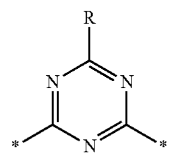

(M7)

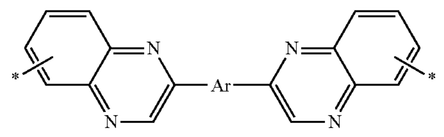

(M8)

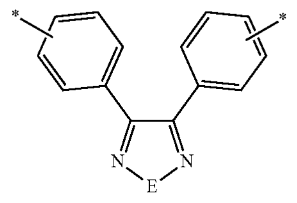

(wherein, in the general formulae (M1) to (M4), W to Z independently represent a group selected from the group consisting of H, $NO_2$, CN, $CF_3$, F, Cl, Br, and I, and r1 to r4 independently represent an integer of 1 to 4; in the general formula (M6), R represents an arbitrary organic group; in the general formula (M7), Ar represents an arbitrary arylene group; and in the general formula (M8), E represents an oxygen atom or a sulfur atom; the general formulae (M1) to (M8) may be further substituted with an electron-withdrawing group(s); and the symbol * represents a linking site between each of the general formulae (M1) to (M8) and one of said constituent units).

4. The block copolymer according to claim 1, comprising said ionic segment(s) and said nonionic segment(s) alternately.

5. The block copolymer according to claim 1, wherein said block copolymer has a second linker site that links said ionic segment to said nonionic segment.

6. The block copolymer according to claim 1, wherein said ionic segment comprises an aromatic polyether structure.

7. The block copolymer according to claim 6, wherein said ionic segment comprises an aromatic polyether ketone structure.

8. The block copolymer according to claim 1, wherein said ionic segment comprises a structure represented by the following general formula (S1):

[Chem. 2]

(S1)

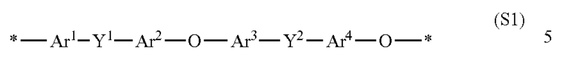

(wherein, in the general formula (S1), $Ar^1$ to $Ar^4$ independently represent a substituted or unsubstituted arylene group, and at least one of $Ar^1$ to $Ar^4$ has an ionic group; $Y^1$ and $Y^2$ independently represent a ketone group or a protective group that may be induced to a ketone group; and the symbol * represents a bond with the general formula (S1) or with another structure).

9. The block copolymer according to claim 8, wherein said structure represented by the general formula (S1) is a structure represented by the following general formula (S2):

[Chem. 3]

(S2)

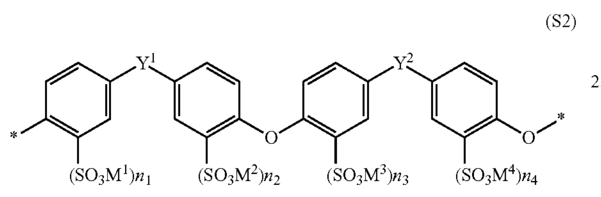

(wherein, in the general formula (S2), $Y^1$ and $Y^2$ independently represent a ketone group or a protective group that may be induced to a ketone group; $M^1$ to $M^4$ independently represent a hydrogen atom, metal cation, or ammonium cation; $n_1$ to $n_4$ are independently 0 or 1, and at least one of $n_1$ to $n_4$ is 1; and the symbol * represents a bond with the general formula (S2) or with another structure).

10. The block copolymer according to claim 1, wherein said nonionic segment comprises an aromatic polyether structure.

11. The block copolymer according to claim 10, wherein said nonionic segment comprises an aromatic polyether ketone structure.

12. The block copolymer according to claim 1, wherein said nonionic segment comprises a structure represented by the following general formula (S3):

[Chem. 4]

(S3)

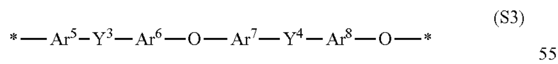

(wherein, in the general formula (S3), $Ar^5$ to $Ar^8$ independently represent an arylene group with the proviso that none of $Ar^5$ to $Ar^8$ contain an ionic group; $Y^3$ and $Y^4$ independently represent a ketone group or a protective group that may be induced to a ketone group; and the symbol * represents a bond with the general formula (S3) or with another structure).

13. The block polymer according to claim 12, wherein said structure represented by the general formula (S3) is a structure represented by the following general formula (S4):

[Chem. 5]

(S4)

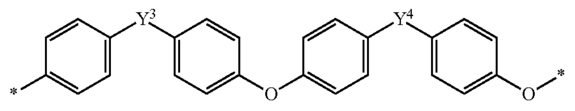

(wherein, in the general formula (S4), $Y^3$ and $Y^4$ independently represent a ketone group or a protective group that may be induced to a ketone group; and the symbol * represents a bond with the general formula (S4) or with another structure).

14. The block copolymer according to claim 1, having a co-continuous phase-separation structure.

15. A method of producing the said block copolymer according to claim 1, comprising at least a step (1) of allowing a compound that gives said constituent units to react with a compound that gives said first linker.

16. The method of producing a block copolymer according to claim 15, comprising, after said step (1), a step (2) of allowing a compound obtained in the step (1) to react with a compound that gives the other segment.

17. The method of producing a block copolymer according to claim 16, comprising, before said step (2), a step (1') of allowing any one compound of a compound that gives said ionic segment and a compound that gives said nonionic segment to react with a compound that gives a second linker, to introduce said second linker into each of both ends of the any one compound.

18. The method of producing a block copolymer according to claim 15, wherein said compound that give said first linker and said compound that gives said second linker are each represented by any one of the following general formulae (N1) to (N8);

[Chem. 6]

(N1)

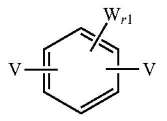

(N2)

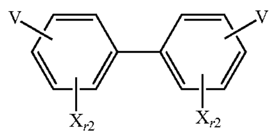

(N3)

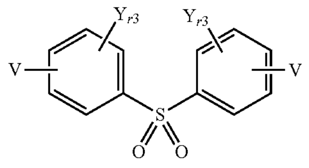

(N4)

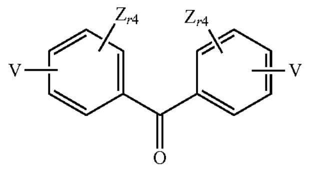

-continued (N5)

(N6)

(N7)

(N8)

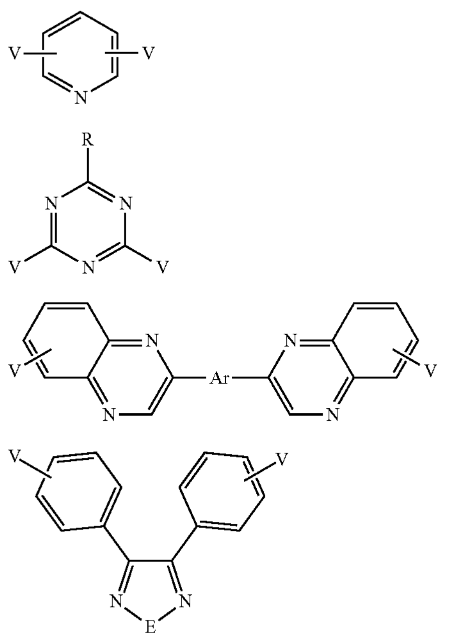

(wherein, in the general formulae (N1) to (N8), V represents Cl or F; in the general formulae (N1) to (N4), W to Z independently represent a group selected from the group consisting of H, $NO_2$, CN, $CF_3$, F, Cl, Br, and I, and r1 to r4 independently represent an integer of 1 to 4; in the general formula (N6), R represents an arbitrary organic group; in the general formula (N7), Ar represents an arbitrary arylene group; in the general formula (N8), E represents an oxygen atom or a sulfur atom; and the general formulae (N1) to (N8) may be further substituted with an electron-withdrawing group(s)).

19. A polymer electrolyte material comprising said block copolymer according to claim 1.

20. A molded polymer electrolyte product comprising said polymer electrolyte material according to claim 19.

21. A polymer electrolyte membrane produced using said polymer electrolyte material according to claim 19.

22. A catalyst coated membrane constituted using said polymer electrolyte material according to claim 19.

23. A membrane electrode assembly constituted using said polymer electrolyte material according to claim 19.

24. A polymer electrolyte fuel cell constituted using said polymer electrolyte material according to claim 19.

25. A water electrolysis hydrogen generator constituted using said polymer electrolyte material according to claim 19.

* * * * *